(12) United States Patent
Kucherov et al.

(10) Patent No.: US 11,281,390 B2
(45) Date of Patent: Mar. 22, 2022

(54) TECHNIQUES FOR DATA MIGRATION

(71) Applicant: EMC IP Holding Company LLC, Hopkinton, MA (US)

(72) Inventors: Anton Kucherov, Dudley, MA (US); David Meiri, Somerville, MA (US)

(73) Assignee: EMC IP Holding Company LLC, Hopkinton, MA (US)

(*) Notice: Subject to any disclaimer, the term of this patent is extended or adjusted under 35 U.S.C. 154(b) by 11 days.

(21) Appl. No.: 16/818,173

(22) Filed: Mar. 13, 2020

(65) Prior Publication Data
US 2021/0286541 A1    Sep. 16, 2021

(51) Int. Cl.
*G06F 3/06* (2006.01)
(52) U.S. Cl.
CPC .......... *G06F 3/0647* (2013.01); *G06F 3/0604* (2013.01); *G06F 3/067* (2013.01); *G06F 3/0685* (2013.01)
(58) Field of Classification Search
CPC ...... G06F 3/0647; G06F 3/0604; G06F 3/067; G06F 3/0685
See application file for complete search history.

(56) References Cited

U.S. PATENT DOCUMENTS

| | | | | |
|---|---|---|---|---|
| 8,453,145 B1* | 5/2013 | Naik | ................... | G06F 9/45537 718/1 |
| 8,819,374 B1* | 8/2014 | Don | ...................... | G06F 3/0607 711/165 |
| 2004/0107176 A1* | 6/2004 | Fuente | ..................... | G06F 3/067 |
| 2012/0317353 A1* | 12/2012 | Web | ....................... | G06F 3/0613 711/108 |
| 2012/0317395 A1* | 12/2012 | Segev | .................... | G06F 16/275 711/216 |
| 2013/0041977 A1* | 2/2013 | Wakamiya | ............ | G06F 9/5077 709/217 |
| 2014/0082273 A1* | 3/2014 | Segev | .................... | G11C 15/00 711/108 |
| 2015/0205687 A1* | 7/2015 | Blea | ..................... | G06F 11/1662 714/6.3 |

(Continued)

OTHER PUBLICATIONS

David Meiri, et al., "System and Method for Data Migration from a CAS Storage System to a NN-CAS Storage System," U.S. Appl. No. 16/662,772, filed Oct. 24, 2019.

*Primary Examiner* — Ryan Bertram
(74) *Attorney, Agent, or Firm* — Muirhead and Saturnelli, LLC

(57) ABSTRACT

Techniques for data migration may include: copying data of a source logical device of a source system to a target logical device of a target system; during said copying, receiving at the target system an I/O operation directed to a logical address of the target logical device and intercepting the I/O operation on the target system; determining, on the target system, to request from the source system a data page stored at the logical address; responsive to determining to request the data page stored, performing processing including: issuing a request to the source system for the data page stored at the logical address; and responsive to receiving said request, sending information from the source system to the target system, wherein the information includes the data page stored at the logical address and additional logical addresses of the source logical device at which the data page is stored.

21 Claims, 12 Drawing Sheets

(56) References Cited

U.S. PATENT DOCUMENTS

| | | | |
|---|---|---|---|
| 2015/0234617 A1* | 8/2015 | Li | G06F 3/0617 |
| | | | 711/114 |
| 2016/0179840 A1* | 6/2016 | Dani | G06F 16/1847 |
| | | | 707/824 |
| 2017/0012825 A1* | 1/2017 | Chandolu | G06F 3/067 |
| 2018/0284988 A1* | 10/2018 | Brown | G06F 3/0647 |
| 2019/0278624 A1* | 9/2019 | Bade | G06F 9/50 |

* cited by examiner

TECHNIQUES FOR DATA MIGRATION

BACKGROUND

Technical Field

This application generally relates to data storage and, more particularly, to data migration.

Description of Related Art

Systems may include different resources used by one or more host processors. The resources and the host processors in the system may be interconnected by one or more communication connections, such as network connections. These resources may include data storage devices such as those included in data storage systems. The data storage systems may be coupled to one or more host processors and provide storage services to each host processor. Multiple data storage systems from one or more different vendors may be connected and may provide common data storage for the one or more host processors.

A host may perform a variety of data processing tasks and operations using the data storage system. For example, a host may issue I/O operations, such as data read and write operations, received at a data storage system. The host systems may store and retrieve data by issuing the I/O operations to the data storage system containing a plurality of host interface units, disk drives (or more generally storage devices), and disk interface units. The host systems access the storage devices through a plurality of channels provided therewith. The host systems provide data and access control information through the channels to a storage device of the data storage system. Data stored on the storage device may also be provided from the data storage system to the host systems also through the channels. The host systems do not address the storage devices of the data storage system directly, but rather, access what appears to the host systems as a plurality of files, objects, logical units, logical devices or logical volumes. Thus, the I/O operations issued by the host may be directed to a particular storage entity, such as a file or logical device. The logical devices may or may not correspond to the actual physical drives. Allowing multiple host systems to access the single data storage system allows the host systems to share data stored therein.

SUMMARY OF THE INVENTION

Various embodiments of the techniques herein may include a method, a system and a computer readable medium for performing data migration comprising: copying data of a source logical device of a source system to a target logical device of a target system; during said copying, receiving at the target system a first I/O operation directed to a first logical address of the target logical device and intercepting the first I/O operation on the target system; determining, on the target system, to request from the source system a first data page stored at the first logical address; responsive to determining to request the first data page stored at the first logical address, performing first processing including: issuing a request from the target system to the source system for the first data page stored at the first logical address; and responsive to receiving said request, sending first information from the source system to the target system, wherein the first information includes the first data page stored at the first logical address and one or more additional logical addresses of the source logical device at which the first data page is also stored. The source system may use a structure to track what data pages of the source device have been migrated to the target system. After said copying copies a page of data stored at a logical address of the source logical device, the structure may be updated to indicate that the page of data stored at the logical address of the source logical device has been migrated. The first processing may include: after said sending the first information from the source system to the target system, updating the structure of the source system to indicate that the first data page has been migrated for the first logical address and each of the one or more additional logical addresses.

In at least one embodiment, the step of copying may include scanning, by the source system, a hash to address (H2A) table for the source logical device. The H2A table may indicate a mapping between a plurality of hash values and a plurality of logical addresses of the source logical device, and wherein the source system may be a content addressable storage (CAS) system having a plurality of data pages stored at the plurality of logical addresses, and each of the plurality of data pages may have a corresponding one of the plurality of hash values. A first hash value of the plurality of hash values may corresponds to the first data page, and a first entry of the H2A table may indicate a mapping from the first hash value to the first logical address and also to the one or more additional logical addresses of the source logical device at which the first data page is also stored.

In at least one embodiment, the source system may organize data stored on first non-volatile by hash values and wherein the source system may use the first hash value to obtain the first page of data from the first non-volatile physical storage. The first data page may be content stored at the first logical address and the one or more additional logical addresses, and wherein the first data page may be stored at a first physical storage location that is mapped to the first logical address and the one or more additional logical addresses as a result of data deduplication processing performed on the source system.

In at least one embodiment, the target system may be a non-CAS system that organizes data stored on second non-volatile storage by physical addresses that are mapped to corresponding logical addresses, and wherein the target system uses the first logical address to identify a first physical address on the second non-volatile storage, where the first page of data is located at the first physical address.

In at least one embodiment, processing may include: receiving, by the source system from the target system, the request for the first data page stored at the first logical address; determining a first hash value for the first data page using an address to hash (A2H) table that maps logical address to hash values, wherein the first hash value is mapped to the first hash value by the A2H table; using the first hash value to obtain the first data page; and determining a list of logical addresses that reference the first data page using a hash to address (H2A) table, wherein the list includes the first logical address and the one or more additional logical addresses, wherein the H2A table maps hash values to logical addresses and the H2A table includes an entry for the first hash value indicating that the first hash value is mapped to the first logical address and the one or more additional logical addresses.

In at least one embodiment, the first I/O operation may be a read operation and said copying may not have copied the first data page stored at the first logical address to the target system, and wherein said determining may determine to request the first data page from the source system in response to determining that the first I/O operation is the read operation and that said copying has not yet copied the first data page stored at the first logical address to the target system. The processing may include: determining, on the target system using a structure of the target system, whether a data page for each of the one or more additional logical addresses is migrated; responsive to determining the data page for said each additional logical address is not migrated, storing the first data page at said each logical address of the target logical device and updating the structure to indicate that the data page of said each additional logical address is migrated; storing the first data page at the first logical address of the target logical device; and updating the structure to indicate that the first data page stored at the first logical address is migrated.

In at least one embodiment, the first I/O operation may be a write I/O operation that writes a partial page of data and said copying may not have copied the first data page stored at the first logical address to the target system, and wherein said determining may determine to request the first data page from the source system in response to determining that the first I/O operation is the write operation that writes a partial page of data and that said copying has not yet copied the first data page stored at the first logical address to the target system. Processing may include: determining, on the target system using a structure of the target system, whether a data page for each of the one or more additional logical addresses is migrated; responsive to determining the data page for said each additional logical address is not migrated, storing the first data page at said each logical address of the target logical device and updating the structure to indicate that the data page of said each additional logical address is migrated; storing the first data page in a buffer and overwriting the buffer with the partial page of data written by the write I/O operation; storing contents of the buffer at the first logical address on the target logical device; and updating the structure to indicate that data stored at the first logical address is migrated.

In at least one embodiment, the first I/O operation may be a write I/O operation that writes a partial page of data and said copying may have copied the first data page stored at the first logical address to the target system, and wherein said determining may determine not to request the first data page from the source system. Processing may include writing the partial page of data of the write operation to the first logical address.

In at least one embodiment, the first I/O operation may be a write I/O operation that writes a full page of data, said copying may have copied the first data page stored at the first logical address to the target system. The processing may include: determining, on the target system, not to request the first data page stored at the first logical address from the source system; writing the full page of data of the write operation to the first logical address; and updating a structure of the target system to indicate that data stored at the first logical address is migrated.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
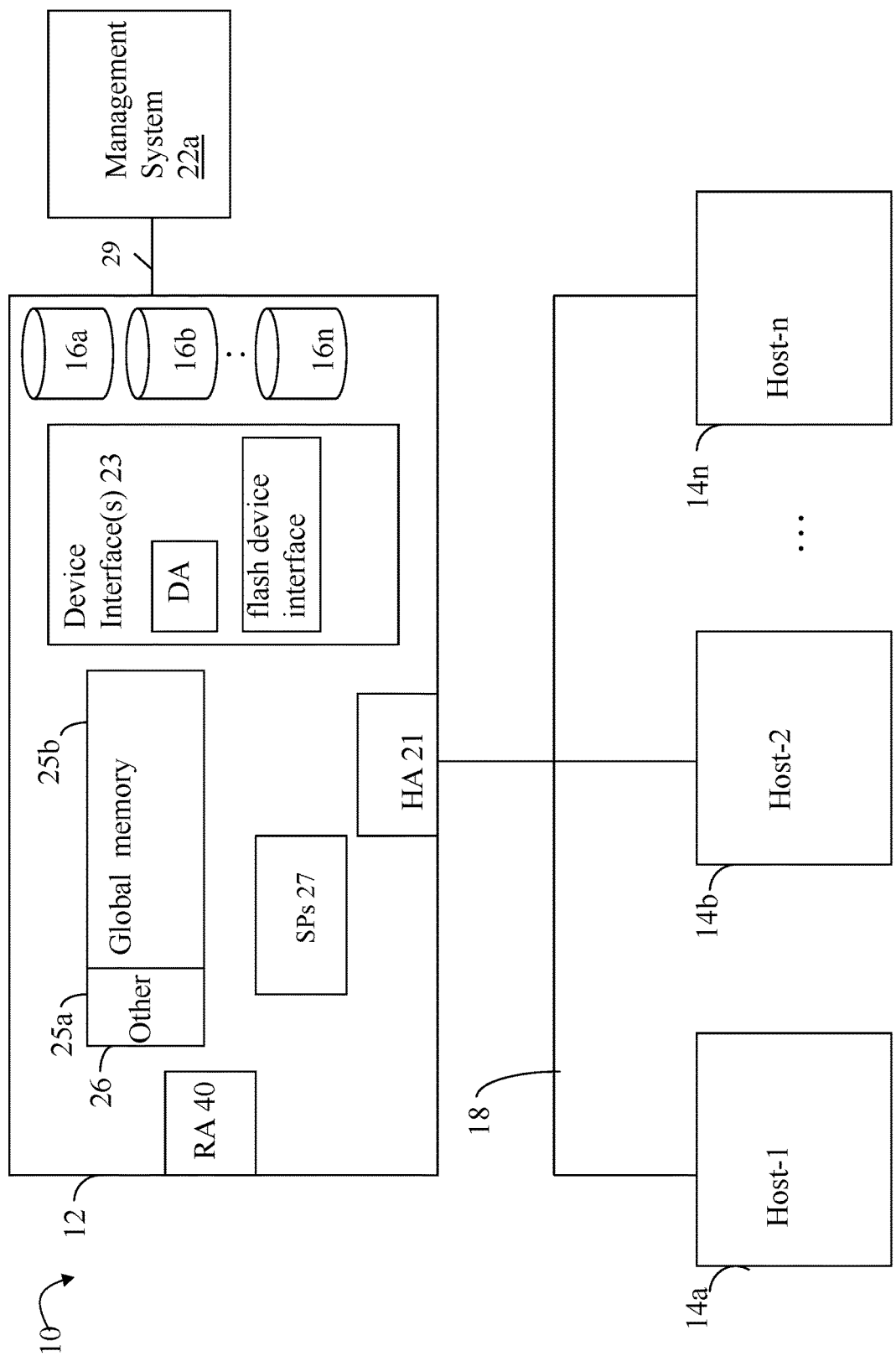
FIG. 1 is an example of components that may be included in a system in accordance with the techniques described herein.

Referring to the FIG. 1, shown is an example of an embodiment of a system 10 that may be used in connection with performing the techniques described herein. The system 10 includes a data storage system 12 connected to the host systems (also sometimes referred to as hosts) 14a-14n through the communication medium 18. In this embodiment of the system 10, the n hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network (including a Storage Area Network (SAN)) or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host systems 14a-14n and data storage system 12 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the hosts 14a-14n and the data storage system 12 may all be located at the same physical site, or, alternatively, may also be located in different physical locations. The communication medium 18 used for communication between the host systems 14a-14n and the data storage system 12 of the system 10 may use a variety of different communication protocols such as block-based protocols (e.g., SCSI, Fibre Channel, iSCSI), file system-based protocols (e.g., NFS), and the like. Some or all of the connections by which the hosts 14a-14n and the data storage system 12 may be connected to the communication medium 18 may pass through other communication devices, such switching equipment that may exist such as a phone line, a repeater, a multiplexer or even a satellite.

Each of the host systems 14a-14n may perform data operations. In the embodiment of the FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN (storage area network) or LAN (local area network), in an embodiment using the techniques herein. It should also be noted that an embodiment may include data storage arrays or other components from one or more vendors. In subsequent examples illustrating the techniques herein, reference may be made to a single data storage array by a vendor. However, as will be appreciated by those skilled in the art, the techniques herein are applicable for use with other data storage arrays by other vendors and with other components than as described herein for purposes of example.

The data storage system 12 may be a data storage appliance or a data storage array including a plurality of data storage devices (PDs) 16a-16n. The data storage devices 16a-16n may include one or more types of data storage devices such as, for example, one or more rotating disk drives and/or one or more solid state drives (SSDs). An SSD is a data storage device that uses solid-state memory to store persistent data. SSDs may refer to solid state electronics devices as distinguished from electromechanical devices, such as hard drives, having moving parts. Flash devices or flash memory-based SSDs are one type of SSD that contains no moving mechanical parts. The flash devices may be constructed using nonvolatile semiconductor NAND flash memory. The flash devices may include, for example, one or more SLC (single level cell) devices and/or MLC (multi level cell) devices.

The data storage array may also include different types of adapters or directors, such as an HA 21 (host adapter), RA 40 (remote adapter), and/or device interface or controller 23. Each of the adapters may be implemented using hardware including a processor with a local memory with code stored thereon for execution in connection with performing different operations. The HAs may be used to manage communications and data operations between one or more host systems and the global memory (GM). In an embodiment, the HA may be a Fibre Channel Adapter (FA) or other adapter which facilitates host communication. The HA 21 may be characterized as a front end component of the data storage system which receives a request from one of the hosts 14a-n. The data storage array may include one or more RAs that may be used, for example, to facilitate communications between data storage arrays. The data storage array may also include one or more device interfaces 23 for facilitating data transfers to/from the data storage devices 16a-16n. The data storage interfaces 23 may include device interface modules, for example, one or more disk adapters (DAs) (e.g., disk controllers), adapters used to interface with the flash drives, and the like. The DAs may also be characterized as back end components of the data storage system which interface with the physical data storage devices.

One or more internal logical communication paths may exist between the device interfaces 23, the RAs 40, the HAs 21, and the memory 26. An embodiment, for example, may use one or more internal busses and/or communication modules. For example, the global memory portion 25b may be used to facilitate data transfers and other communications between the device interfaces, HAs and/or RAs in a data storage array. In one embodiment, the device interfaces 23 may perform data operations using a system cache that may be included in the global memory 25b, for example, when communicating with other device interfaces and other components of the data storage array. The other portion 25a is that portion of memory that may be used in connection with other designations that may vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, may also be included in an embodiment.

The host systems 14a-14n provide data and access control information through channels to the storage systems 12, and the storage systems 12 may also provide data to the host systems 14a-n also through the channels. The host systems 14a-n do not address the drives or devices 16a-16n of the storage systems directly, but rather access to data may be provided to one or more host systems from what the host systems view as a plurality of logical devices or logical volumes (LVs) which may also referred to herein as logical units (e.g., LUNs). A logical unit (LUN) may be characterized as a disk array or data storage system reference to an amount of storage space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical disk drives or more generally physical storage devices. For example, one or more LUNs may reside on a single physical disk drive, data of a single LUN may reside on multiple different physical devices, and the like. Data in a single data storage system, such as a single data storage array, may be accessed by multiple hosts allowing the hosts to share the data residing therein. The HAs may be used in connection with communications between a data storage array and a host system. The RAs may be used in facilitating communications between two data storage arrays. The DAs may be one type of device interface used in connection with facilitating data transfers to/from the associated disk drive(s) and LUN(s) residing thereon. A flash device interface may be another type of device interface used in connection with facilitating data transfers to/from the associated flash devices and LUN (s) residing thereon. It should be noted that an embodiment may use the same or a different device interface for one or more different types of devices than as described herein.

In an embodiment in accordance with the techniques herein, the data storage system may be characterized as having one or more logical mapping layers in which a logical device or volume of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

It should be noted that although examples of the techniques herein may be made with respect to a physical data storage system and its physical components (e.g., physical hardware for each HA, DA, HA port and the like), the techniques herein may be performed in a physical data storage system including one or more emulated or virtualized components (e.g., emulated or virtualized ports, emulated or virtualized DAs or HAs), and also a virtualized or emulated data storage system including virtualized or emulated components.

Also shown in the FIG. 1 is a management system 22a that may be used to manage and monitor the data storage system 12. In one embodiment, the management system 22a may be a computer system which includes data storage system management software or application such as may execute in a web browser. A data storage system manager may, for example, view information about a current data storage configuration such as LUNs, storage pools, and the like, on a user interface (UI) in a display device of the management system 22a. Alternatively, and more generally, the management software may execute on any suitable processor in any suitable system. For example, the data storage system management software may execute on a processor of the data storage system 12.

It should be noted that each of the different adapters, such as HA, DA, RA, and the like, may be implemented as a hardware component including, for example, one or more processors, one or more forms of memory, and the like. Code may be stored in one or more of the memories of the component for performing processing.

The device interface or backend device controller, such as a DA, performs I/O operations on a physical device or drive 16a-16n. In the following description, data residing on a LUN may be accessed by the device interface following a data request in connection with I/O operations. For example, a host may issue an I/O operation which is received by the HA 21. The I/O operation may identify a target location from which data is read from, or written to, depending on whether the I/O operation is, respectively, a read or a write operation request. The target location of the received I/O operation may be expressed in terms of a LUN and logical address or offset location (e.g., LBA or logical block address) on the LUN. Processing may be performed on the data storage system to further map the target location of the received I/O operation, expressed in terms of a LUN and logical address or offset location on the LUN, to its corresponding physical storage device (PD) and location on the PD. The DA which services the particular PD may further perform processing to either read data from, or write data to, the corresponding physical device location for the I/O operation.

It should be noted that an embodiment of a data storage system may include components having different names from that described herein but which perform functions similar to components as described herein. Additionally, components within a single data storage system, and also between data storage systems, may communicate using any suitable technique that may differ from that as described herein for exemplary purposes. For example, element 12 of the FIG. 1 may be a data storage system, such as a data storage array, that includes multiple storage processors (SPs). Each of the SPs 27 may be a CPU including one or more "cores" or processors and each may have their own memory used for communication between the different front end and back end components rather than utilize a global memory accessible to all storage processors. In such embodiments, the memory 26 may represent memory of each such storage processor.

Generally, techniques herein may be used in connection with any suitable storage system, appliance, device, and the like, in which data is stored. For example, an embodiment may implement techniques herein using a midrange data storage system, such as a Dell EMC Unity® data storage system, as well as a high end or enterprise data storage system, such as a Dell EMC™ PowerMAX™ data storage system.

The data path or I/O path may be characterized as the path or flow of I/O data through a system. For example, the data or I/O path may be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receiving a response (possibly including requested data) in connection such I/O commands.

The control path, also sometimes referred to as the management path, may be characterized as the path or flow of data management or control commands through a system. For example, the control or management path may be the logical flow through hardware and software components or layers in connection with issuing data storage management command to and/or from a data storage system, and also receiving responses (possibly including requested data) to such control or management commands. For example, with reference to the FIG. 1, the control commands may be issued from data storage management software executing on management system 22a to the data storage system 12. Such commands may be, for example, to establish or modify data services, provision storage, perform user account management, and the like. For example, commands may be issued over the control path to provision storage for LUNs, create a snapshot, define conditions of when to create another snapshot, define or establish local and/or remote replication services, define or modify a schedule for snapshot or other data replication services, define a RAID group, obtain data storage management and configuration information for display in a graphical user interface (GUI) of a data storage management program or application, generally modify one or more aspects of a data storage system configuration, list properties and status information regarding LUNs or other storage objects (e.g., physical and/or logical entities in the data storage system), and the like.

The data path and control path define two sets of different logical flow paths. In at least some of the data storage system configurations, at least part of the hardware and network connections used for each of the data path and control path may differ. For example, although both control path and data path may generally use a network for communications, some of the hardware and software used may differ. For example, with reference to the FIG. 1, a data storage system may have a separate physical connection 29 from a management system 22a to the data storage system 12 being managed whereby control commands may be issued over such a physical connection 29. However, it may be that user I/O commands are never issued over such a physical connection 29 provided solely for purposes of connecting the management system to the data storage system. In any case, the data path and control path each define two separate logical flow paths.

In connection with a data storage system such as described herein, an I/O request may be a read request to read data. The read request may be received at the data storage system at a port of a front-end component of the data storage system (such as one of the HAs as described elsewhere herein). In terms of processing a read request (e.g. the read I/O path), a determination may be made as to whether all the requested read data is in cache (e.g., a cache hit where read data is stored in a data cache). If so, the read request may be characterized as a read hit, cache hit or read cache hit. In such cases of a read hit, the front-end component, such as the HA, receiving the read request may service the read request by retrieving all requested read data from the cache and returning the requested read data to the host. If all the requested read data is not in cache, the read may be characterized as a read miss (e.g., cache miss) whereby processing is performed to retrieve from physical storage any portion of the requested data that is not currently in cache. As described above, one or more DAs may perform processing to retrieve from physical storage any portion of the requested data not currently in cache. Once all the requested read data is in cache, the front-end component, such as the HA, receiving the read request may service the read request by retrieving all requested read data from the cache and returning the requested read data to the host. In this manner, a front-end component may service read requests using data that is already stored in cache prior to processing the read request, as well as using data that is brought into cache from physical storage responsive to receiving the read request.

Storing such data in cache is performed with the goal of servicing subsequent I/Os using cached data without having to retrieve the data from physical storage. In an embodiment in accordance with techniques herein, processing may be performed as just described to unconditionally cache reads as a result of a cache miss and to execute a dependent sequence of steps whereby the DA, or more generally a backend physical storage device controller, retrieves the requested data from a PD and writes the retrieved read miss data (retrieved from the PD) to the cache where the HA, or more generally front end component, then retrieves the requested data from the cache to return to the requesting host.

In connection with write operations and write I/O path processing, write data received at the data storage system may be stored in cache and then written out or destaged later to physical storage, such as written to backend physical storage devices by a DA. Once the write data is written into cache, the data may be marked as dirty or write pending (WP) in cache denoting that the cached write data is the most recent copy of the data and needs to be destaged to backend physical storage devices. The cache location including the WP data may marked as dirty thereby indicating that the cache location includes valid data and contains the most recent copy of the data but has not yet been synchronized with the copy on physical non-volatile storage of the back end PDs. Once the write data is written to cache, the data storage system may send an acknowledgement to the host that the write operation has been completed even though the write data may not have yet been destaged from cache to the backend physical storage devices. Once the WP data has been destaged from cache to physical storage, the cache location including the write data may be characterized as clean where the cache location is valid and contains a copy of write data that has been synchronized with backend physical storage.

As data for I/Os and other processing is stored in the cache, a cache memory location, such as a cache slot or cache page, may be allocated for use in storing such data. At various points in time, there may not be any free or available cache or the amount of free or available cache may reach a minimum threshold level. In response to such conditions and possibly others, processing may be performed in connection with cache management to obtain a free or available cache location such as by evicting one or more cache pages. Generally, any suitable cache management technique known in the art may be used to manage the cache. For example, an embodiment may use the least recently used (LRU) cache management technique which may remove data from cache based on when the data has been last referenced. For example, a time stamp may be associated with each data portion stored in the cache where the time stamp denotes the last time (e.g., date, hour, minutes, seconds in terms of wall clock time) the data portion was referenced. The most recently referenced data may have the most recent time stamp and may remain in the cache longer than other data referenced having older time stamps. The foregoing time stamps may be used to select particular data for eviction when a new cache location is needed to store new data. The foregoing time stamps may also be used in a proactive cache management technique, for example, to select data for removal when the amount of free or available cache falls below a specified amount. Data may be removed from the cache by destaging pending write data, evicting data from one or more cache pages that are the least recently used with respect to cached data, and the like.

Although not illustrated in FIG. 1 for simplicity, an embodiment may store additional information for cached data, such as read and write data described above that may be stored in the data cache. For example, for a particular LUN and offset, such additional information may map the particular LUN and offset to a cache location containing the data for that LUN and offset. Such additional information may also, for example, map a particular PD and PD offset to a cache location containing the data for that PD and offset. Generally, such additional information may be stored in any suitable location and used, for example, by the HA, DA and other data storage system components and executing code, as an index to map into the cache to retrieve and/or store data from the cache. For example, the HA may manage and/or use cache mapping information that maps a LUN and LUN offset to a cache location including data stored at the LUN offset on the particular LUN. The DA may manage and/or use cache mapping information mapping a PD and offset on the PD to a cache location including data stored at the offset on the particular PD for use in destaging write data from cache to backend non-volatile PDs 16a-n.

Data storage systems may include different storage tiers having different types of non-volatile storage media. For example, as noted above, in at least one embodiment, the data storage system may include one or more tiers of rotating disk drives and include a tier of SSD drives (e.g., flash-based storage drives). Data portions may be proactively moved or relocated between different storage tiers. For example, consider a multi-tiered storage system with 3 storage tiers—an SSD tier of flash-based drive, a tier of 15K RPM rotating disk drives and a tier of 10K RPM rotating disk drives. The foregoing 3 storage tiers may be ranked based on performance where the SSD tier may be ranked as the highest, the tier of 15K RPM drives ranked second highest and the tier of 10K RPM dries ranked lowest/least in terms of performance. A data portion, such as mapped to a subrange of a LUN logical address space, may be relocated between different ones of the foregoing 3 tiers in an automated fashion based on the temperature or frequency of access of I/Os to the data portion at various points in time. At a first point in time, the data portion may be accessed frequently for reading and/or writing and may be stored in the SSD tier. At a second later point in time, the data portion's frequency of access may be greatly reduced (e.g., idle) and may be relocated, via demotion, from the SSD tier to a lower performing tier, such as the 10K or 15K RPM tier. At yet a third point in time subsequent to the second point in time, the data portion may be frequently accessed again and may be promoted to a higher performing tier (e.g., relocated from the 10K or 15K RPM tier to the SSD tier). In at least one embodiment, the data storage system may include multiple SSD tiers of non-volatile storage where each of the SSD tiers has different characteristics that affect latency when accessing the physical storage media to read or write data.

Figure 2:
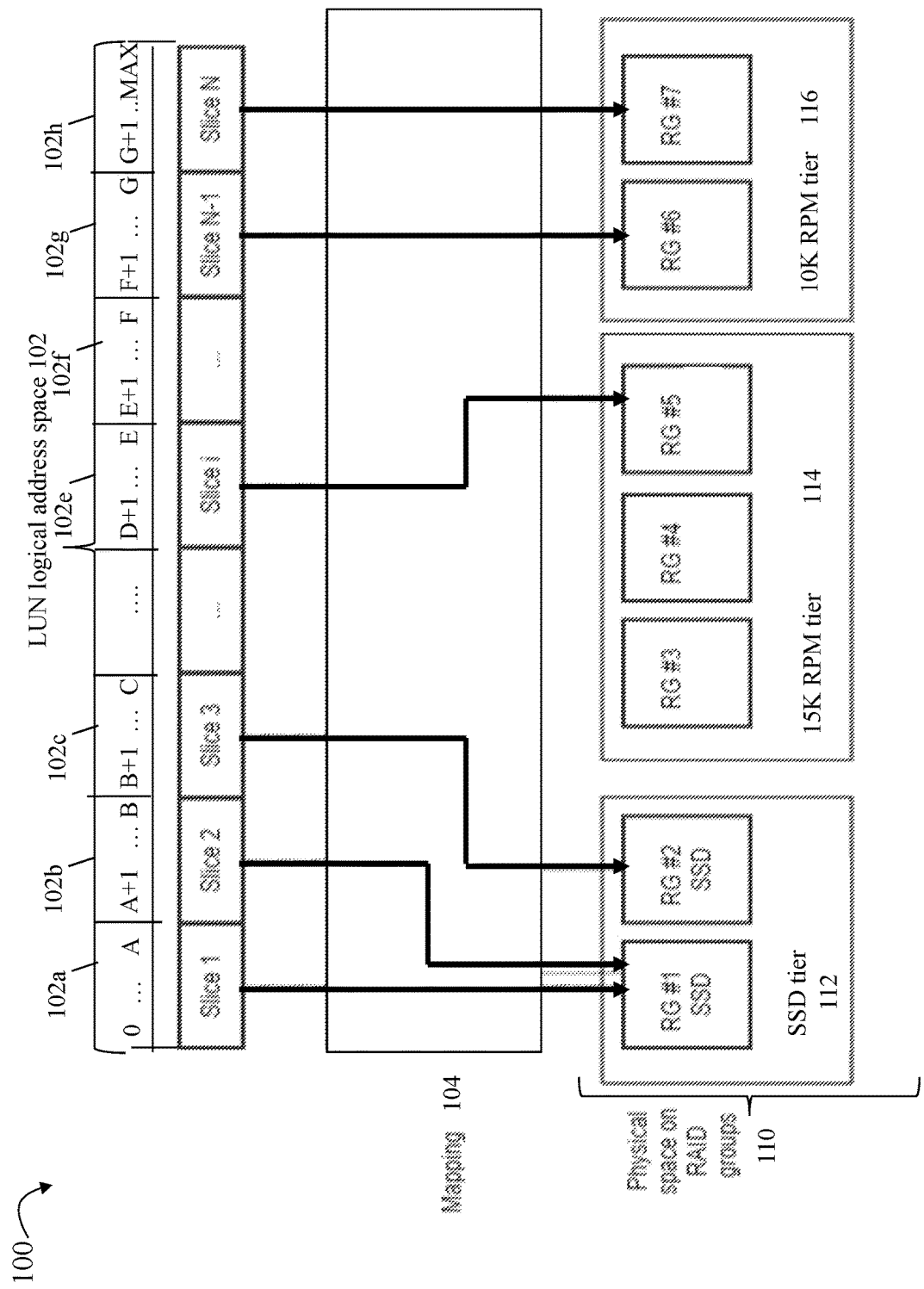
FIG. 2 is an example illustrating logical to physical mapping that may be used in an embodiment in accordance with the techniques herein.

Referring to FIG. 2, shown is an example illustrating logical to physical mapping in a data storage system. The example 100 illustrates how the logical address space or range of a LUN 102 is mapped via mapping layer 104 to different slices, segments or more generally, portions of physical memory of non-volatile physical storage devices (110) providing back-end data storage, such as denoted by PDs 16a-n in FIG. 1. The example 100 include storage tiers 112 (SSD tier), 114 (15K RPM tier) and 116 (10K RPM tier) comprising the PDs 110 as noted above. Element 102 may denote the LUN's logical address space, having a starting logical address, block or offset of 0, and an ending maximum logical address, MAX. The LUN's logical address space 102 in the example 100 is partitioned into equal logical address space portions (denoted by 102a-h) where each of the portions 102a-h is mapped to region of physical storage, also referred to as slices or segments, on the different PDs of different ones of the storage tiers of 110. As noted above, data storage system software may periodically remap portions of the LUN's logical address space to keep the most actively used or accessed portions of 102a-n on slices of the highest performance tier 112 in efforts to maximum data storage system I/O performance. As shown in FIG. 2, PDs of the tiers 112, 114 and 116 may be configured into RAID groups (denoted as RG #1-7 in FIG. 2) each having a suitable RAID level to provide data protection.

In connection with user data that is written to a LUN and then stored on the PDs, or more generally, back-end non-volatile storage devices, various types of metadata (MD) may also be stored. The MD may include, for example, various structures used to access the stored user data, attributes about the LUN, and the like. To further illustrate, the MD for a LUN may include location information identifying where the user data is stored on physical storage such as disks or flash-based non-volatile storage. Consistent with discussion herein, the data storage system may receive a host I/O that reads or writes data to a target location expressed as a LUN and offset, logical address, track, etc. on the LUN. The target location is a logical LUN address that may map to a physical storage location where data stored at the logical LUN address is stored. Thus, one type of MD for an LBA of a LUN may include location MD identifying the physical storage location mapped to the particular LBA. In at least one embodiment, the location MD may be included in the mapping layer 104.

Data storage systems may also perform data services selected for use in connection with user data stored on LUNs, and thus PDs, of the data storage system. For example, in at least one embodiment in accordance with the techniques herein, the data storage system may perform one or more data reduction services or operations such as data deduplication. Data deduplication generally refers to removing redundant or duplicate data portions. Data deduplication techniques may include looking for duplicate data chunks whereby only a single instance of the data chunk is retained and stored in the cache and the backend PDs providing the non-volatile physical storage. Pointers or references to the data chunk may be used which reference or identify the single stored instance of the data chunk. With data deduplication in at least one data storage system, a data chunk may be the size of a single page of data such as may be stored in a single entry or page of the cache. The data may be addressed or referenced by a unique name, token, identifier, and like, derived from the content of the data. In at least one embodiment, a hash value derived from the content or data using a hash function may be used to refer to the content or data. As known in the art, the hash value may be generated using a hash function such as a cryptographic hashing function or other suitable hash function.

Figure 3:
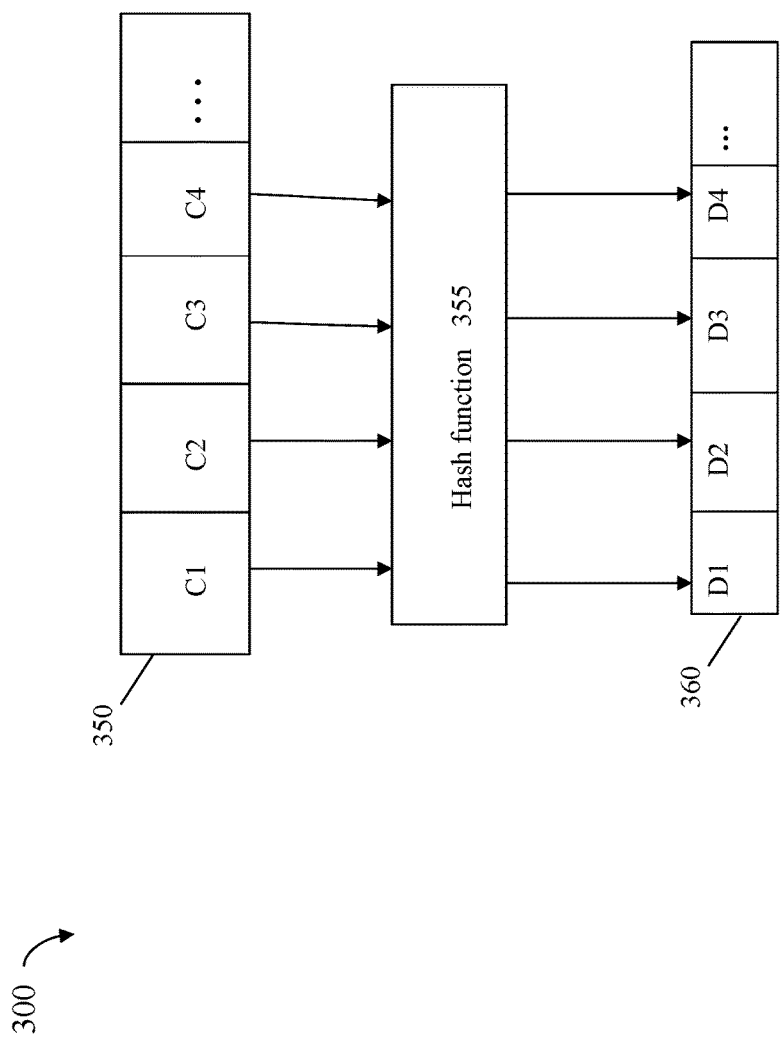
FIG. 3 is an example illustrating use of a hash function in computing hash values or digests for chunks, blocks or pages of data in an embodiment in accordance with the techniques herein.

Referring to FIG. 3, shown is an example 300 illustrating processing that may be performed in connection with data deduplication processing in an embodiment in accordance with techniques herein. The element 350 may denote the original data being written or stored. The original data may be partitioned into multiple data chunks C1, C2, C3, C4 and the like. In at least one embodiment, the data chunks may all be the same size, such as a single logical block. However, the size may vary with embodiment. Each chunk is provided as an input to hash function 355. In at least one embodiment, the hash function 355 may be the SHA-256 or SHA-1 hashing algorithm, or more generally, any suitable cryptographic hashing function known in the art. For each chunk of 350, the hash function 355 may perform processing and generate, as an output, a hash, hash value, hash signature or digest. Element 360 includes digests D1, D2, D3, D4, and the like, where a corresponding different one of the digests DN is generated for one of the chunks CN (where "N" is an integer denoting the chunk and associated digest generated for that chunk). For example, D1 is the digest generated for C1, D2 is the digest generated for C2, D3 is the digest generated for C3, and so on. Generally, a hash function 355 is selected which has an acceptably low probability of a "hash collision" of generating the same digest or hash value for two different chunks. The strength of the hash function 355 may be measured by the unlikelihood of a collision occurring two different input chunks of data produce the same digest. The strength increases with the bit length of the hash value or digest. Thus, if two chunks, such as C1 and C3, have the same digests whereby D1=D3, then chunks C1 and C3 match (e.g., are identical matching data chunks). If two chunks, such as C1 and C4, have different digests whereby D1 does not equal D4, then chunks C1 and C4 do not match (e.g., are different or non-matching data chunks). In cases where two matching or identical chunks have the same digest, only a single copy of the data chunk may be stored in the cache as well as on the backend PDs. The single stored instance of the data chunk may be referenced, for example, using the digest, which is the hash value of the cached data chunk. In cases of a hash collision (where two data chunks result in generating the same digest), an embodiment may use any suitable technique to handle the collision. For example, in one embodiment, a list may be maintained for different data chunks mapping to the same digest. When determining whether a new data chunk is a duplicate of an existing data chunk already stored, the new data chunk may be considered a duplicate if the new data chunk and the existing chunk have the same digest. Additionally, since there may be hash or digest collisions in which 2 different data chunks have the same hash or digest, processing performed to confirm that a new data chunk and an existing data chunk having the same digest are actually identical may include additionally comparing the new and existing data chunks (e.g., bit for bit) and determining whether the new data chunk matches the existing data chunk. In a system maintaining a list of different data chunks having the same digest, such processing may include traversing the list and comparing a new data chunk to each existing data chunk on the list to locate a matching existing data chunk for the new data chunk.

With reference back to FIG. 2, different data storage systems may use different techniques embodied in the mapping layer 104 to map a logical address of a host I/O operation to a storage location including the data or contents for the logical address, where the logical address may be expressed in the form of a LUN and LBA on the LUN. The storage location may be a physical storage location, such as a physical storage slice, in the backend non-volatile PDs of the data storage system.

Content Addressable Storage (CAS) is a way of storing information that can be retrieved from the backend PDs based on the stored content, instead of a storage location at which the content is stored. Some data storage systems may be CAS systems in which the data stored on the system may be organized and accessed in the backend PDs by hash values or signatures based on the stored content or data. As such, the mapping layer 104 of a CAS system may include components that perform processing needed in order to read data from, and write data to, the physical location in the backend PDs including the desired data. A hash signature, that is generated based on the data, may be used to retrieve the data from the backend PDs. In CAS systems, data may be stored in pages or blocks of any suitable size, such as 4 KB or 16 KB, where each such page or block has a unique hash value or signature. In at least one embodiment in which the data storage system is a CAS system, host I/Os may be routed to control or C modules in the data storage system where the C modules implement a logical address to hash (A2H) lookup. The A2H lookup may be performed using an A2H table that maps a logical address, such as a LUN and LBA of a host I/O operation, to a corresponding hash value. Using a hash function, the hash value may be generated based on the particular data or contents stored at the logical address. The hash function may be any suitable hash function such as the hash function 355 described above. For example, in at least one embodiment, the hash function used may be a cryptographic hashing function known in the art. In a CAS system, the hash value obtained from the A2H table may be used to read or write the data or contents of the logical address by providing the hash value to a backend component, such as the DA described elsewhere herein or another equivalent module or component that provides connectivity to the backend PDs. The DA then uses the hash value to access, or more generally read or write, the desired data or content stored at the logical address.

In at least one embodiment, a data storage system may be a CAS storage system that performs data deduplication as discussed herein. In a case where the same data or contents is stored at multiple different logical addresses, the multiple different logical addresses may be mapped to or reference the same physical storage location in the backend PDs that includes the single instance of the data or contents. In such a CAS system where the single instance of the data or contents has a hash value derived from the data or contents, the multiple different logical addresses referencing the same physical storage location may be mapped to the same hash value by the A2H table.

Some data storage system may be characterized as traditional or non-CAS systems in which the data may be organized and accessed in the backend PDs by physical addresses or locations associated with the data. In at least one embodiment of a data storage system that is a non-CAS system, the logical addresses used may be those included in the host I/O operations, where each logical address may include a LUN and LBA or offset in the LUN's logical address space. In non-CAS systems, a mapping may be maintained between the logical addresses and corresponding physical addresses, where the physical addresses identify physical storage locations on the backend PDs. The data or contents stored at a logical address may be read from or written to physical storage by providing the physical storage location (that is mapped to the logical address) to a backend component. The backend component may be, for example, the DA described elsewhere herein or another equivalent module or component that provides connectivity to the backend PDs.

Migrating data from a source data storage system, that may be a CAS system that performs deduplication, to a target data storage system may be inefficient. In at least one embodiment, the target data storage system may be a non-CAS system. For example, at least one existing data migration may run as a "pull" process on the target system that requests or pulls the data from the source system to the target system. The "pull" process may read the data from the source system in a sequential manner such as by sequentially reading consecutive logical block addresses or offsets included in a logical address range of a LUN. In this case, the data may be migrated via the read requests originating from the target system to the source system without regard for whether any of the read data has been deduplicated on the source system. For example, assume that the source system has determined that 3 logical addresses include the same data. Using the "pull" process, the target system may issue 3 read requests for the 3 logical addresses on 3 different LUNs. Depending on particulars of the source system, the source system may have to retrieve the same data 3 times from the backend PDs of the source system in order to service the reads. Additionally, the "pull" process used for migration may have other inefficiencies. For example, for data pages of the source system being migrated may have all zeroes for the data contents. The "pull" process may continue to issue normal read requests for such all zero data pages which is wasteful.

Described in following paragraphs are techniques that may be used in connection with performing data migration. In at least one embodiment, the source data storage system may be a CAS system that has performed data deduplication on the data that is migrated to the target data storage system. In at least one embodiment, the target data storage system may be a non-CAS system. In at least one embodiment, the target data storage system may perform data deduplication. In at least one alternative embodiment, the target data storage system may not perform data deduplication.

In at least one embodiment, one or more source LUNs from the source data storage system may be migrated to one or more corresponding target LUNs on the target data storage system. The migration may be characterized as an online migration. Prior to commencing the migration of the data, the host is able to issue I/Os to the source LUNs on the source data storage system. Subsequently, during and after the migration, the host is able to issue I/Os to the target LUNs on the target data storage system. In at least one embodiment, each source LUN and its corresponding target LUN may be configured as the same LUN to have the same logical device identity and characteristics from the host or external client perspective. In this manner in at least one embodiment, the source LUN and its corresponding target LUN may appear to the host as the same LUN over different paths.

The techniques described in following paragraphs may be characterized as performing a combination of pulling data, where requests for data are issued from the target data storage system to the source data storage system, and also pushing data, where data is sent from the source data storage system to the target data storage system. Prior to commencing the data migration, a source LUN to be migrated from the source data storage system may be identified. Additionally, a target LUN corresponding to the source LUN may be identified and initialized, such as by zeroing out the target LUN by marking all its data as zero. Prior to the migration, the host may direct I/Os to only the source LUN and not the target LUN. Once the source LUN and target LUN are prepared for the migration to commence, the host may direct I/Os to the target LUN on the target data storage system rather than the source LUN on the source data storage system. The source system and the target system may each independently track which data blocks or pages for logical addresses of the source LUN have been migrated.

Processing may be performed to migrate the data from the source LUN to the target LUN. The migration processing may include the source system sending or pushing data of the source LUN to the target system in an ordering based on traversal of a hash to address (H2A) table for the source LUN. As the source system pushes data pages or blocks stored at particular logical addresses of the source LUN to the target system, the source system may update a source system structure to indicate migration is complete for such logical addresses of the source LUN.

Additionally, during the migration process, the target system may activate intercept mode in which all I/Os received at the target system for the target LUN are intercepted and deviate from the normal I/O or data path processing. The I/Os may be sent, for example, from a host. The I/Os directed to the target LUN may be read or write operations.

When intercept mode is active on the target system for the target LUN, for an intercepted read operation that reads data from a first logical address on the target LUN and is received at the target system, it is determined whether the requested read data of the first logical address has been migrated. If not, the target system issues a request to the source system for the data stored at the first logical address. In response, the source system provides the requested data stored at the first logical address. Additionally in the response, the source system may provide information identifying one or more additional logical addresses of the source LUN, and thus the target LUN, that have the same data or contents as the first logical address. Thus, the requested data stored at the first logical address as well as the one or more additional logical addresses storing the same data as the first logical address may be returned to the target system in the response. Assuming that none of the additional logical addresses are currently marked as migrated in the target system structure, the target system stores the same data at the first logical address and the additional logical addresses on the target LUN and indicates in the target system structure that data migration is complete for such logical addresses. Additionally, the requested read data may be returned to the host or other client that initiated the read operation once the read data has been stored in the cache.

When intercept mode is active on the target system for the target LUN, for an intercepted read operation that reads data from a first logical address on the target LUN where the requested read data has been migrated, the target system processes the read normally and returns the requested read data to the host or other client that initiated the read operation.

When intercept mode is active on the target system for the target LUN, for an intercepted write operation that writes a full page or block of data to a first logical address on the target LUN and is received at the target system, the write is processed normally whereby the write data of the write operation is written to the first logical address of the target LUN and the target system marks in the target system structure that migration is complete for the first logical address. In this manner should the source system subsequently send or push the data stored at the first logical address of the source LUN, the target system discards or ignores the pushed data due to the migrated status of the first logical address in the target system structure. The pushed data is considered stale and not the most recent version or copy of the data stored at the first logical address. Rather, the data written by the write operation is considered the most recent up to date and valid data for the first logical address of the target LUN.

When intercept mode is active on the target system for the target LUN, for an intercepted write operation that writes a partial page or block of data to a first logical address on the target LUN and is received at the target system, it is determined whether the data of the first logical address has been migrated. If not, the target system issues a request to the source system for the data stored at the first logical address. In response, the source system provides the requested data stored at the first logical address, where the requested data is a full block or page of data. Additionally in the response, the source system may provide information identifying one or more additional logical addresses of the source LUN, and thus the target LUN, that have the same data or contents as the first logical address. Thus, the requested data stored at the first logical address as well as the one or more additional logical addresses storing the same data as the first logical address may be returned to the target system in the response. Assuming that none of the additional logical addresses are currently marked as migrated in the target system structure, the target system stores the same data returned from the source system at the additional logical addresses on the target LUN and indicates that data migration is complete for such logical addresses. The target system may determine the contents of the complete block or page of data to be stored at the first logical address by overwriting the page or block of data returned from the source system with the new partial data block or page written to the first logical address by the write operation. The target system may then store the result of the foregoing overwriting to the first logical address on the target LUN. The target system updates the target system structure to indicate that migration for the first logical address is complete.

When intercept mode is active on the target system for the target LUN, for an intercepted write operation that writes a partial page or block of data to a first logical address on the target LUN and is received at the target system, processing may determine that the data of the first logical address has been migrated. In this case, the target system may write the new partial data block or page to the first logical address by the write operation. The target system updates the target system structure to indicate that migration for the first logical address is complete.

The foregoing and other aspects of the techniques herein are described in more detail in the following paragraphs.

Figure 4A:
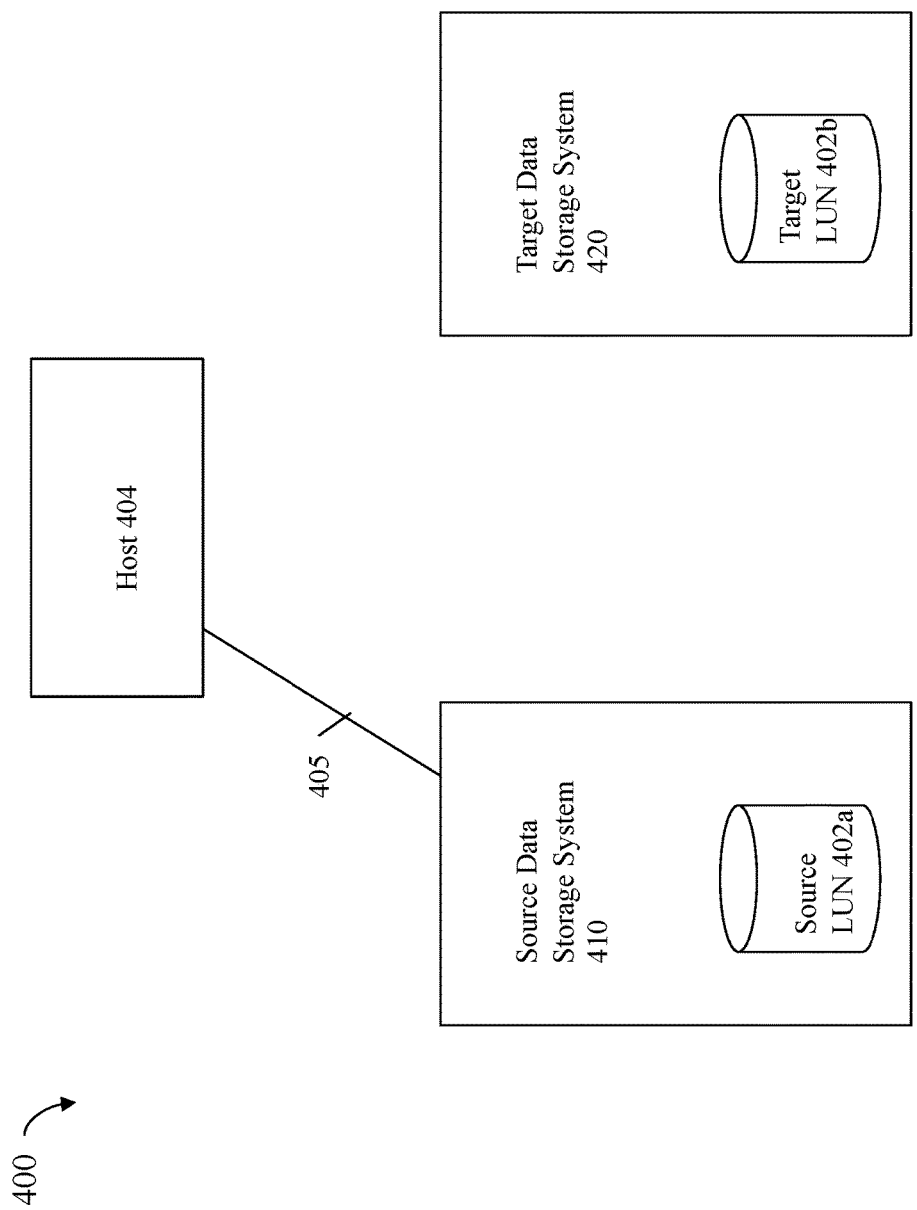
FIGS. 4A and 4B are examples of systems, components and data flow illustrating an embodiment in accordance with the techniques herein.

Referring to FIG. 4A, shown is an example of components that may be used in an embodiment in accordance with the techniques herein at a first point T1 in time prior to migration. The example 400 includes the source data storage system (source DS) 410, the target data storage system (target DS) 420 and host 404. The source LUN 402a is included in the source DS 410 and the target LUN 402b is included in the target DS 420. At the time T1, the host 404 may issue I/O operations, such as read and write I/O operations, to the source LUN 402a over the connection or path 405 between the host 404 and the source DS 410.

At the time T1, the target LUN 402b may be prepared for the migration by initializing the data content of the target LUN 402b. For example, in at least one embodiment, the target LUN 402b may be initialized by storing zeroes to the target LUN 402b. Generally any suitable technique may be used to initialize the target LUN 402b and invalidate any existing data that may be currently stored on the target LUN 402b.

The migration to be performed as described in following paragraphs migrates the data of the source LUN 402a to the target LUN 402b.

Figure 4B:
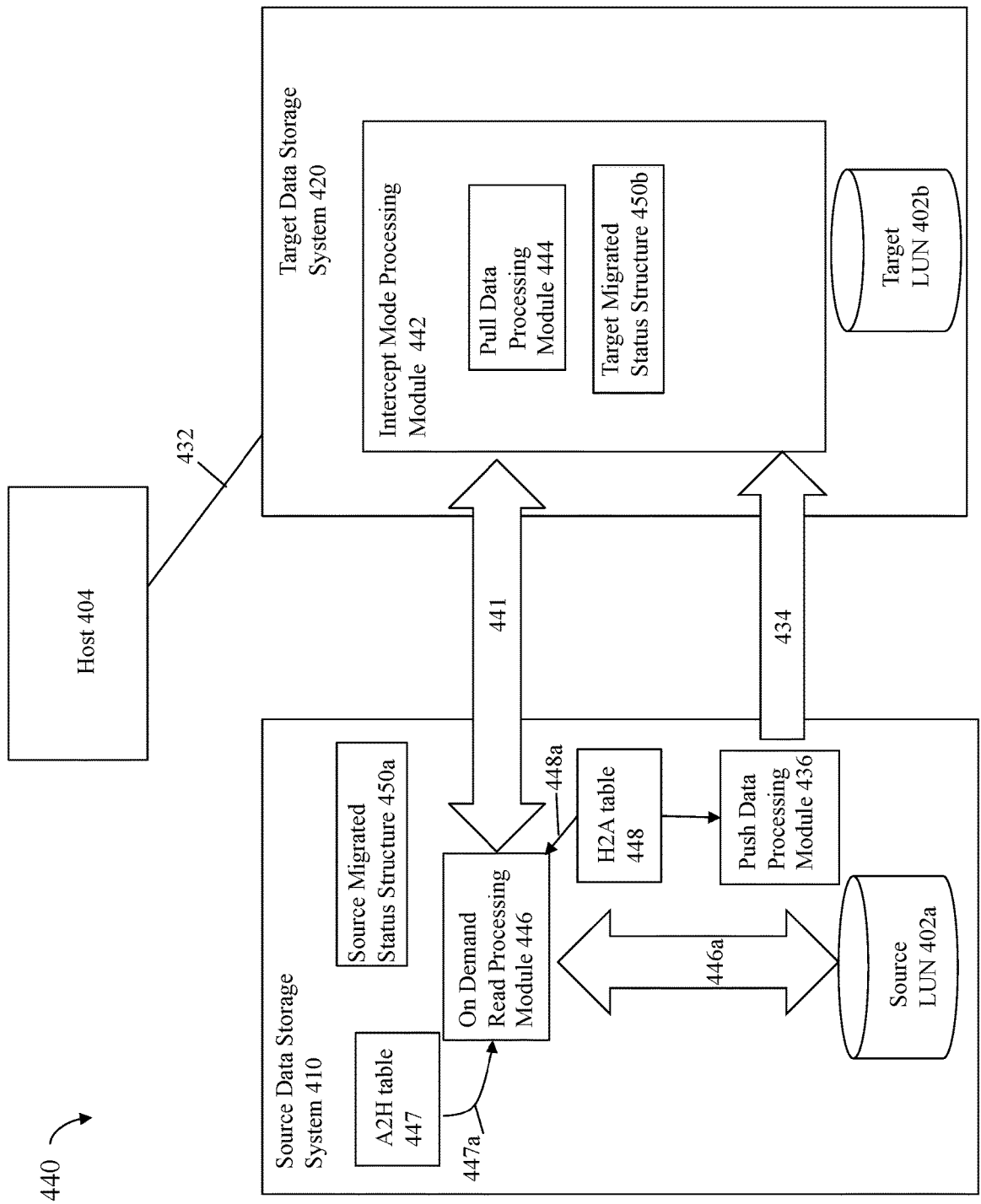

With reference to FIG. 4B, At a second point in time T2 that is subsequent to T1, the host 404 switches over from working against the source LUN 402a to working against the target LUN 402b. In this case, the host 404 ceases sending I/Os to the source LUN 402a at the source DS over the connection 405 and the host 404 sends I/Os to the target LUN 402b over the connection or path 432.

In at least one embodiment, the source LUN 402a and the target LUN 402b may be configured to have the same identity from the perspective of the host 404 whereby the source LUN 402a and the target LUN 402b appear to the host 404 as the same logical device or LUN, such as the same LUN A. In this manner, the host 404 may view the path 405 of FIG. 4A and the path 432 of FIG. 4B as 2 different paths to the same LUN. At the time T1, the host 404 uses the path 405 to issue I/Os to the LUN A and at the time T2 the host 404 uses the path 432 to issue I/O to the LUN A.

It should be noted that although FIG. 4B illustrates only the path 432 without the path 405 of FIG. 4A, an embodiment may have both the paths 405 and 432 configured at the same time T2. However, at the time T2, the source DS 410 may be configured to not service I/O operations received over the path 405 and the target DS 420 may be configured to service I/O operations received over the path 432.

As a variation, other embodiments may configure the source LUN 402a and the target LUN 402b to have different identities from the perspective of the host 404, where the source LUN 402a and the target LUN 402b appear to the host 404 as two different logical devices or LUNs. In this manner, the host 404 may view the path 405 of FIG. 4A as one path to a first LUN 402a having a first identity, and path 432 as a second path to a second LUN 402b having a second identity. In connection with performing migration processing in such an embodiment, the host 404 may issue I/Os over the path 405 up until the time T2. The host 404 may be aware that the source LUN 402a is populated with data that will be migrated to the target LUN 402b. As such, at the time T2, the host 404 may switch over and use the LUN target 402b rather than the source LUN 402a by sending I/Os over the path 432 to the target LUN 402b rather than over the path 405 to the source LUN 402a with the knowledge that I/O servicing will be handled by the target DS 420. The host 404 may view and use the LUN 402b in place of the LUN 402a even though the data of the LUN 402a has not yet been migrated over to the LUN 402b.

Also at the time T2, intercept mode is activated on the target DS 420 for the target LUN 402b. When intercept mode is activated on the target DS 420 for the target LUN 402b, I/Os directed to the target LUN 402b are intercepted on the I/O path or data path for special processing also referred to herein as intercept mode processing that may be performed by the intercept mode processing module 442.

At a third point T3 in time subsequent to the time T2, processing may be performed by the push data processing module 436 to copy or migrate 434 data of the source LUN 402a to the target LUN 402b. In at least one embodiment, the push data processing module 436 may sequentially traverse the H2A table 448 and push or send information included in the H2A table 448 to the target DS 420. In the example 440, the H2A table 448 may include information for the source LUN 402a being migrated.

Figure 5A:
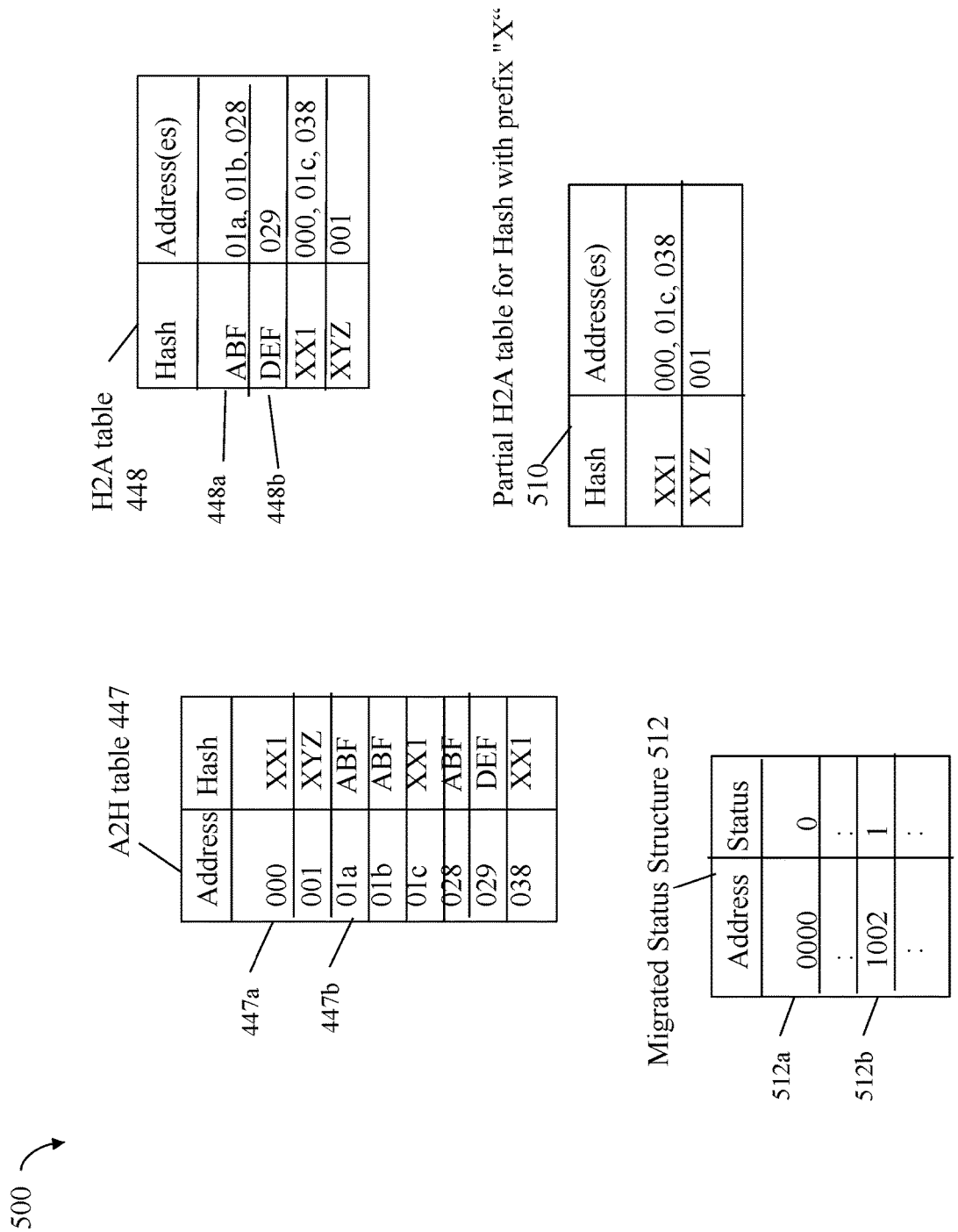
FIG. 5A is an example of structures that may be used in an embodiment in accordance with the techniques herein.

Referring to FIG. 5A, shown in more detail is an example of the H2A table 448. It should be noted that the various tables in FIG. 5A includes logical addresses and hash values presented in a shortened simplified form for purposes of illustration of the techniques herein. More generally, the hash values and the logical addresses in an embodiment may be more suitably longer having more than 3 digits or characters as illustrated in FIG. 5A.

Consistent with other discussion herein, the H2A table 448 of FIG. 5A includes an entry for each stored data page or block where the stored data page or block may be referenced by one or more logical addresses. Each entry of the H2A table 448 includes a hash value denoted in the first column and a list of one or more addresses in the second column. For example, the entry 448a indicates that the hash value ABF is referenced by the list of logical addresses: 01a, 01b and 028; and the entry 448b indicates that the hash value DEF is reference by a single logical address: 029.

Referring back to FIG. 4B, the push data processing module 436 may traverse the H2A table 448 and send 434 the information of each entry in the H2A table 448 to the target DS 420. The information of a single entry of the H2A table 448 may be sent to the target DS in one or more write I/O commands directed to the target LUN 402b.

In at least one embodiment, for each entry of the H2A table having a hash value and a list of one or more logical addresses, a write command may be sent by the module 436 to the target DS 420 for each logical address in the list. The write command writes the data block or page logical having the hash value of the entry to the logical address on the target LUN 402b. For example, referring to the entry 448a of FIG. 5A, the list of logical addresses includes 3 logical addresses 01a, 01b and 028. Assume the data page or block B1 has the hash value ABF of the entry 448a. 3 write commands may be sent where each write command writes the data page or block B1 to a different one of the 3 logical addresses.

Traversing the H2A table of entries and sending the write command for each logical address in each entry has benefits. For example, pages or blocks of the source LUN 402a which have no data or have not been written to (e.g., as may be denoted by zeroes) are skipped since the H2A table 448 may only include entries for data blocks or pages that have been written to. As another benefit, the page or block of data for each entry is read at most once from the backend PDs of the source DS and is then used as the data payload for one or more write commands. As yet another benefit, consider a target DS that performs deduplication. In this case, the target DS has a good opportunity to deduplicate the data payload of the multiple writes associated with a single entry of the H2A table where such multiple writes are sent in close time proximity. For example, with reference to the 3 writes described above sent in connection with the entry 448a, the 3 writes may be sent in close proximity of time meaning that any deduplication database on the target DS, as small as it may be, may recognize the duplication of the data page or block B1 and store only a single instance of the data page or block B1.

As a variation, for each entry of the H2A table having a hash value and a list of one or more logical addresses, a single write command may be sent by the module 436 to the target DS 420 for the entire entry rather than a single write for each logical address of the entry (as discussed above). The single write command may have a data payload of the data page or data block B1 and the command may also include the list of one or more logical addresses on the target LUN 402b. For example, referring to the entry 448a of FIG. 5A, the list of logical addresses includes 3 logical addresses 01a, 01b and 028. Assume the data page or block B1 has the hash value ABF of the entry 448a. The single write command may include the data page or block B1 as a write data payload and may also include the list of the 3 logical addresses 01a, 01b and 028. In at least one embodiment using the SCSI standard and issuing SCSI I/O commands, a vendor-specific or vendor-unique write command may allow specifying the list of logical addresses along with the data payload. The latter variation provides the befits noted above along with an additional benefit in that the data page or block B1 is only transmitted 434 once.

The source DS 410 may include a structure, such as the source migrated status structure 450a, that may be used by the source DS 410 to track which pages or blocks of data for particular logical addresses have been migrated. Generally, the structure 450a may be used by the push data processing module 436 to track the migration status of each logical address of the source LUN 402a. Initially, the structure 450a may indicate that the data page or block stored at each logical address is not migrated. As the data page or block for each logical address of the source LUN 402a is pushed, transmitted or written by the push data processing module 436 to the target LUN 402b on the target DS, the status of such logical address is updated in the structure 450a to migrated. For example, for the entry 448a, after sending one or more writes that write the data page or block B1 to the 3 logical addresses 01a, 01b, and 028, the corresponding entries in the structure 450a for the 3 logical addresses may be updated to migrated.

As write commands are issued by the push data processing module 436 to the target DS to push data page or blocks for all logical addresses in the entries in the entire H2A table 448 to the target DS 420, the structure 450a may be accordingly updated to denote that data pages or blocks stored at such logical addresses has been migrated. At the end of such processing, any remaining logical addresses denoted in the structure 450a as not migrated identify those logical addresses of the source LUN 402a that have no stored data and therefore have not been written to, such as by the host 404. Once the one or more write commands have been issued by the push data processing module 436 for all the entries in the H2A table, migration of the source LUN 402a to the target LUN 402b has completed.

As noted above, intercept mode processing for the target LUN 402b is enabled during the migration of the source LUN 402a to the target LUN 402b. The intercept mode processing module 442 may intercept each I/O received at the target DS 420 where the I/O is directed to the target LUN 402b. Such I/Os may include generally any I/O that reads or writes data of the target LUN 402b. Such I/O intercepted by the module 442 includes the write I/Os issued by the push data processing module 436 of the source DS 410 as well as I/Os from the host 404.

The target DS 420 may also use a structure, the target migrated status structure 450b, to track the migration status of the data page or block for each logical address of the source LUN 402a, and thus the target LUN 402b. Generally, as each write command that writes to a logical address of the target LUN 402b is received at the target DS 420 from the push data processing module 436, the target DS 420 may examine the structure 450b to determine whether the logical address has a status of migrated. If the structure 450b indicates the status for the logical address is not migrated, the target DS 420 may store the pushed data page or block at the logical address and update the structure to indicate the logical address has a migrated status. If the structure 450b indicates the status for the logical address is migrated, the target DS 420 may ignore or discard the pushed data page of the write command. Consistent with other discussion herein, such a status of migrated for the logical address prior to receiving the data page for the logical address from the module 436 means that the data page pushed by the module 436 is stale or old data that has been overwritten during the migration with a write I/O, such as from the host 404, received at the target DS 420.

What will now be described is additional processing performed by the intercept mode processing module 420 when intercepting I/Os directed to the target LUN 402b during the migration, where such I/Os are from the host 404 received at the target DS 420 over the connection 432 when intercept mode is enabled for the target LUN 402b.

The module 442 may determine whether the host I/O is a read I/O that reads data from a migrated data page or block (e.g., reads from a logical address whose data has already been migrated). If so, normal I/O read processing is performed. The module 442 may examine the structure 450b to determine whether the read I/O is requesting to read data from a logical address included in a migrated or non-migrated page.

If the host I/O is a read I/O that reads data from a logical address in a non-migrated data page or block, the pull data processing module 444 may perform processing to issue 441 an on demand read request or pull for the data page or block including the read data from the source DS 410. The on demand read request may be a read I/O operation that is received by the on demand read processing module 446. The on demand read request may be a request to read the data page or block stored at the logical address specified in the host read I/O. In response, the module 446 may use both the A2H table 447a and the H2A table 448. More specifically, in at least one embodiment, the module 446 may use the logical address A1 of the on demand read request to index into the A2H table 447 to obtain the hash H1 for A1. The hash H1 may be derived from the data page or block B1. The hash H1 may be used to obtain the desired data page or block stored in the source DS 410 that is a CAS system. The hash H1 may also be used to index into the H2A table 448 to obtain a list of the one or more logical addresses of the source LUN 402a that store the data page or block having the hash H1. This list includes at least the address A1 and may include one or more other logical addresses which store the same data block B1 as the logical address A1. In other words, deduplication processing on the source DS has stored a single instance of the data block or page B1 having the hash value H1 where the same data block or page is stored at multiple logical addresses of the source LUN. In connection with the techniques herein, when the source DS sends the requested data page or block B1 for A1, the source DS also sends the other additional logical addresses that also reference or store the same data block or page B1. The on demand read request sent from the module 444 may request the data block or page B1 for A1. However, in response, the source DS that performs data deduplication also sends additional information including the additional logical addresses that store the same data page or block B1. For example with reference to the entry 448a, the on demand read request may request the data page or block stored at logical address 01a. The source DS uses the A2H table 447 by indexing into the table 447 to locate entry 447b for the logical address 01a. The entry 447a indicates that the data page or block stored at logical address 01a has hash value ABF. Next, the hash value ABF is used to index into the H2A table 448 and locates entry 448a for the hash value ABF. The entry 448a indicates that the list of the 3 logical addresses 01a, 01b and 028 each store the same data page or block having the hash ABF. The data page or block B1 having the hash ABF may be obtained from backend PDs of the source DS and returned 441 to the module 444 along with the list of the 3 logical addresses 01a, 01b and 028. For each logical address included in the list sent in the response to the on demand read request, the source DS may update its structure 450a to indicate the data page or block stored at the logical address is migrated.

In connection with the response returned to the target DS for the on demand read request as described above, the target DS may populate each the logical addresses of the list with the same data page or block B1, provided the logical address has not yet been migrated (as indicated by the structure 450b. The structure 450b of the target DS may be updated to indicate a migrated status for each logical address in the list at which the target DS stored the data page or block B1. Additional benefits may also be obtained using the foregoing response. For example, consider a target DS that performs deduplication. In this case, the target DS may easily deduplicate the data page or block B1 that is stored at the 3 logical addresses 01a, 01b and 028.

If the host I/O is a write I/O that writes a full or complete page or block to a target logical address, the intercept mode processing module 442 may perform normal write I/O processing and update the target DS's structure 450b to indicate the data page or block at the target logical address is migrated.

If the host I/O is a write I/O that writes a partial page or block to a target logical address and the data page or block for the target logical address is not yet migrated, processing may be performed to obtain the data page or block (that is a full data page or block) and then overwrite the data page with the newly written partial page data of the write I/O. In at least one embodiment, the data pull processing module 444 requests and receives from the source DS the data page or block along with a list of one or more logical addresses where the data page or block is stored. The foregoing may be as discussed above in connection with the response returned to the on demand request issued for the read I/O operation that requests read data from a non-migrated page or block. The response returned may include the requested data block or page and a list of one or more logical addresses at which the request data block is stored. The contents for the full or complete data block stored at the target logical address of the host partial page write may be determined by storing the returned data page or block in a temporary buffer, overwriting the buffer with the partial block of the host write I/O data, and then storing the resulting contents of the buffer to the target logical address on the target LUN. Additionally, the returned data page may be stored on the target LUN at each additional logical address in the list if the data page for the logical address is not yet migrated. The target DS's migrated status structure 450b may be updated to indicate that the data block stored at the target logical address has been migrated. Additionally, the structure 450b may be updated to indicate a migrated status for each other logical address in the list at which the returned data page is stored.

If the host I/O is a write I/O that writes a partial page or block to a target logical address and the data page or block including the target logical address is migrated, the partial block of the host write I/O data may be written to the target logical address on the target LUN.

Once the push data processing module 436 of the source DS 410 completes processing for all entries in the H2A table 448, the migration of the source LUN 402a to the target LUN 402b is complete and the intercept mode on the target DS 420 for the target LUN 402b is disabled. At this point, any page or block of the target DS that is not migrated as indicated by the structure 450b may be considered as including invalid data where no data has been written. Consistent with other discussion herein, in at least one embodiment, such data pages of blocks not migrated may be considered as having zeroes or other content stored therein indicating the invalid data content.

Referring to FIG. 5A, shown are examples of tables that may be used in an embodiment in accordance with the techniques herein. The example 500 includes the A2H table 447, the H2A table 448, the migrated status structure 512 and the partial H2A table 510. As discussed above, the A2H table 447 includes entries each mapping a logical address of a LUN to a hash value derived from a data page or block stored at the logical address of the entry. As also discussed above, the H2A table 448 includes entries each mapping a hash value derived from a data page or block to a list of one or more logical addresses at which the data page or block is stored. The H2A table 448 may be constructed using any suitable technique. For example, in at least one embodiment, the H2A table 448 for a LUN may be constructed from the A2H table for the LUN.

The migrated status structure 512 is an example of a structure that may be used for each of the structure 450a and 450b of the FIG. 4B to denote migration statuses of data pages stored at particular logical addresses. The structure 512 may include an entry for each logical address at which a page or block of data may be stored. The entry may denote a status of migrated if the page or block of data stored at the logical address has been migrated. Otherwise, the entry may denote a status of not migrated. In at least one embodiment, the structure 512 may be implemented as a bit vector with an entry for each such logical address where the entry associated with a logical address includes a 1 if the page or data block stored at the associated logical address has been migrated, and includes a 0 otherwise. For example, entry 512a indicates that the data page or block stored at logical address 0000 is not migrated; and entry 512b indicates that the data page or block stored at the logical address 1002 is migrated. More generally, the structure 512 may be implemented using any suitable data structure.

Building an H2A table may be memory-intensive, and in some cases, the full H2A table for the complete source LUN on the source DS may not fit in memory. Thus, an embodiment may choose to partition or split the push data processing, and the H2A table into a suitable number of segments. This may be done by setting a hash prefix and building the H2A table in segments for each prefix. For example, the partial H2A table 510 is an example of a partial H2A table including hashes that begin with the prefix "X". Note that the hash in each entry of the table 510 begins with "X". To further illustrate by a simple example, consider a source DS where there is only enough memory to hold ⅛ of the H2A table. In this case, a hash prefix size of 3 bits (e.g., 000) may be selected and the H2A table may be constructed and processed for 8 segments. Each of the 8 segments may be associated with a specified 3 bit hash prefix where each of the 8 segments only includes H2A entries with hash values that start with the specified 3 bit prefix.

Figure 5B:
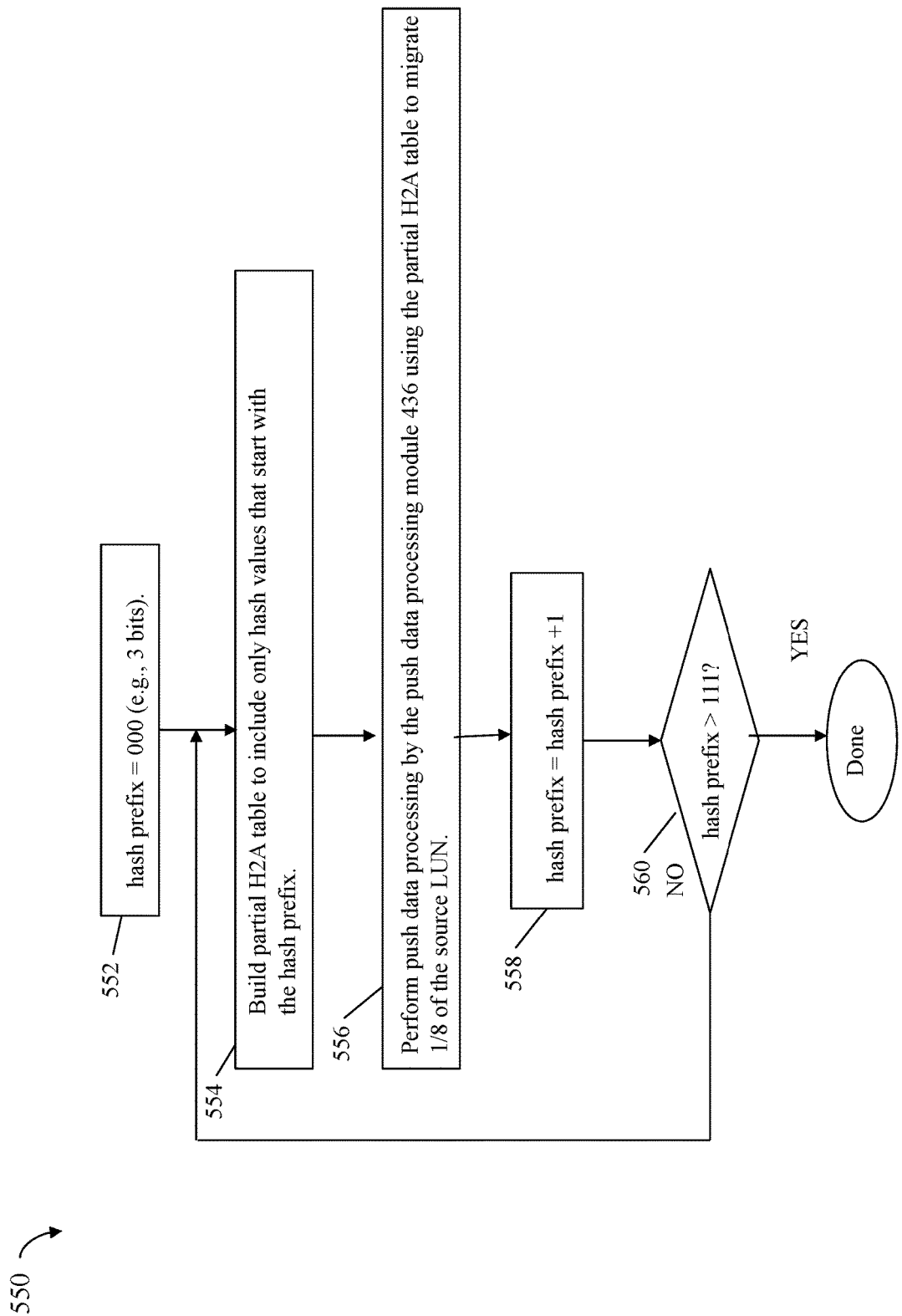
FIGS. 5B, 6, 7A, 7B, 8 and 9 are flowcharts of processing steps that may be performed in an embodiment in accordance with the techniques herein.

For example, reference is made to the FIG. 5B. At the step 552, the hash prefix may be assigned 000 denoting a 3 bit hash prefix where all bits are 0. From the step 552, control proceeds to the step 552. At the step 554, the partial H2A table is built to include entries for only the hash prefixes that being with 000, the current hash prefix. From the step 554, control proceeds to the step 556. At the step 556, push data processing may be performed by the push data processing module 436 using the partial H2A table to migrate ⅛ of the source LUN. From the step 556, control proceeds to the step 558. At the step 558, the hash prefix is incremented by 1. From the step 558, control proceeds to the step 560 where a determination is made as to whether the hash prefix is greater than the 3 bit prefix value of 111 (which is 7 in base 10). If the step 560 evaluates to yes, processing stops and the source LUN migration is complete. If the step 560 evaluates to no, processing proceeds to the step 554.

In the example presented in FIG. 5B and described above, migration may be performed in 8 iterations, each time for ⅛ of the source LUN's data pages or blocks, where the page or blocks are divided into 8 segments based on their associated hash values.

What will now be described in connection with FIGS. 6, 7A, 7B, 8 and 9 are other flowcharts of processing steps that may be performed in an embodiment in accordance with the techniques herein. The processing in the flowcharts of the FIGS. 6, 7A, 7B, 8 and 9 summarize processing described above.

Figure 6:
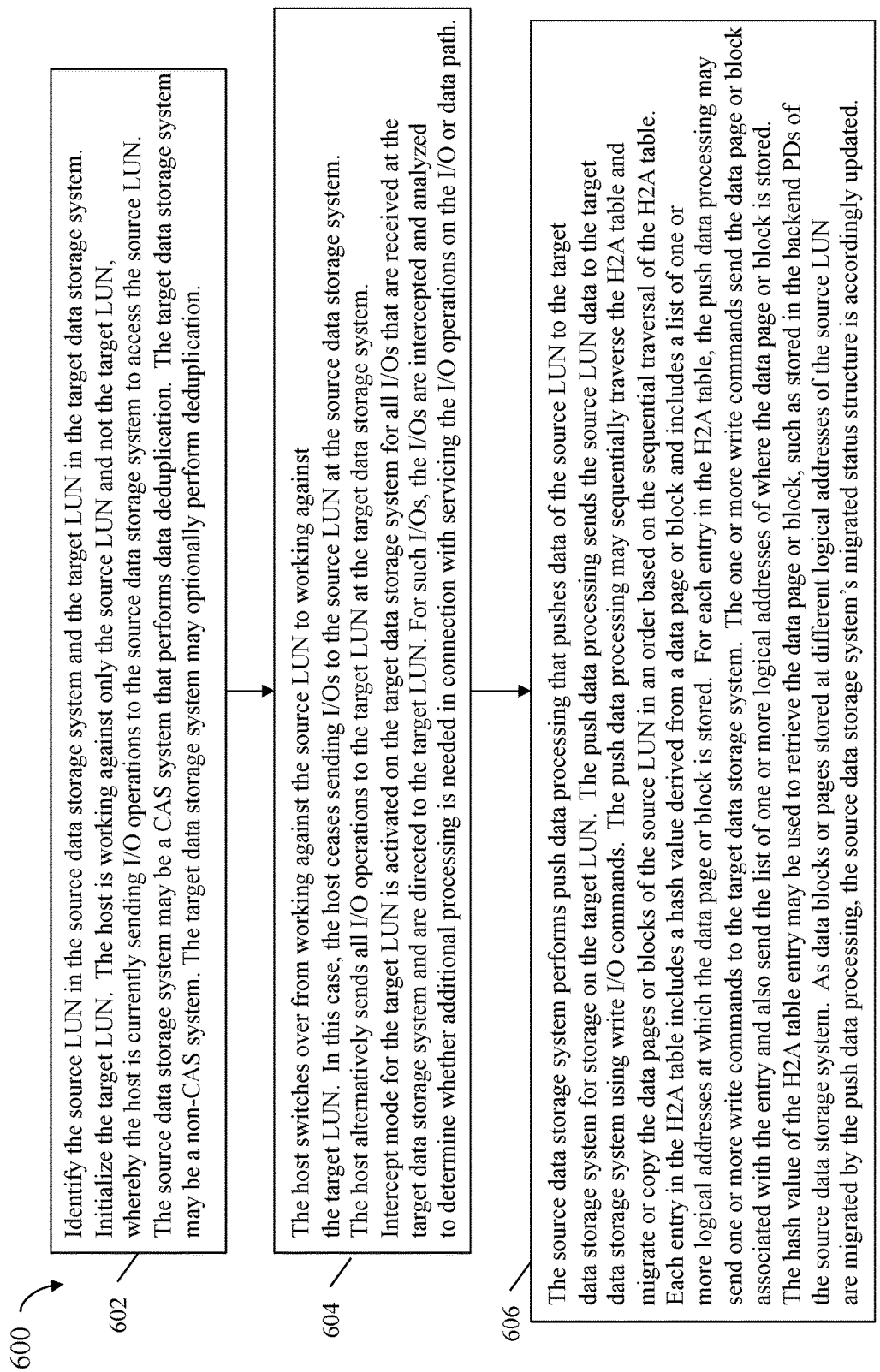

Referring to FIG. 6, shown is a flowchart 600 of processing that may be performed in an embodiment in accordance with the techniques herein.

At the step 602, processing may be performed to identify the source LUN in the source DS and the target LUN in the target DS. The target LUN may be initialized. The host may be working against, or with, only the source LUN and not the target LUN, whereby the host is currently sending I/O operations to the source DS to access the source LUN. The source data DS may be a CAS system that performs data deduplication. The target DS may be a non-CAS system. The target DS may optionally perform deduplication. From the step 602, control proceeds to the step 604.

At the step 604, the host switches over from working against, or with, the source LUN to working against, or with, the target LUN. In this case, the host ceases sending I/Os to the source LUN at the source DS. The host alternatively sends all I/O operations to the target LUN at the target DS. Intercept mode for the target LUN is activated on the target DS for all I/Os that are received at the target DS and are directed to the target LUN. For such I/Os, the I/Os are intercepted and analyzed to determine whether additional processing is needed in connection with servicing the I/O operations on the I/O or data path. From the step 604, control proceeds to the step 606.

At the step 606, the source DS performs push data processing that pushes data of the source LUN to the target DS for storage on the target LUN. The push data processing sends the source LUN data to the target DS using write I/O commands. The push data processing may sequentially traverse the H2A table and migrate or copy the data pages or blocks of the source LUN in an order based on the sequential traversal of the H2A table. Each entry in the H2A table includes a hash value derived from a data page or block and includes a list of one or more logical addresses at which the data page or block is stored. For each entry in the H2A table, the push data processing may send one or more write commands to the target DS. The one or more write commands send the data page or block associated with the entry and also send the list of one or more logical addresses of where the data page or block is stored. The hash value of the H2A table entry may be used to retrieve the data page or block, such as stored in the backend PDs of the source DS. As data blocks or pages stored at different logical addresses of the source LUN are migrated by the push data processing, the source DS's migrated status structure is accordingly updated.

Figure 7A:
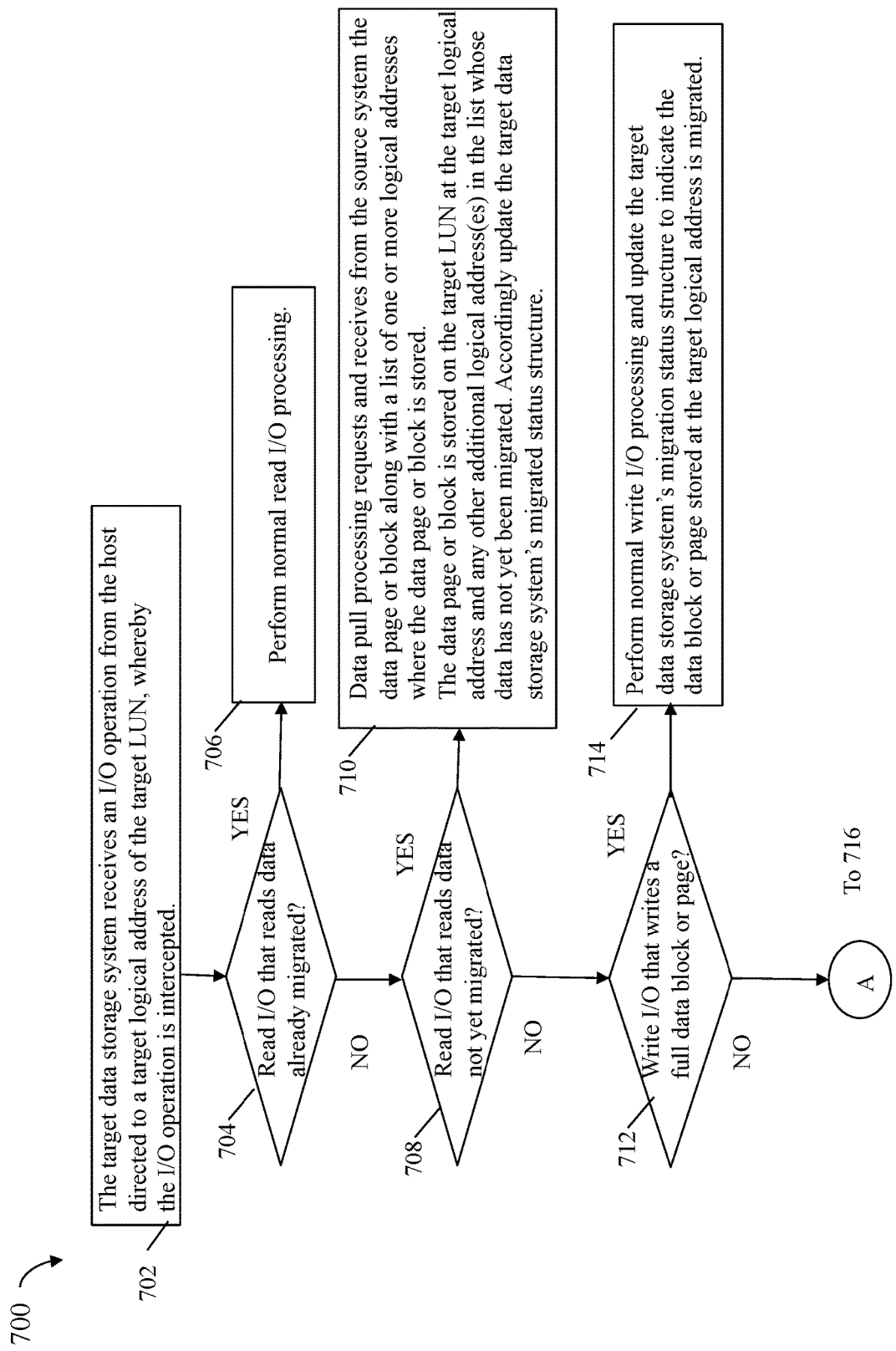
Figure 7B:
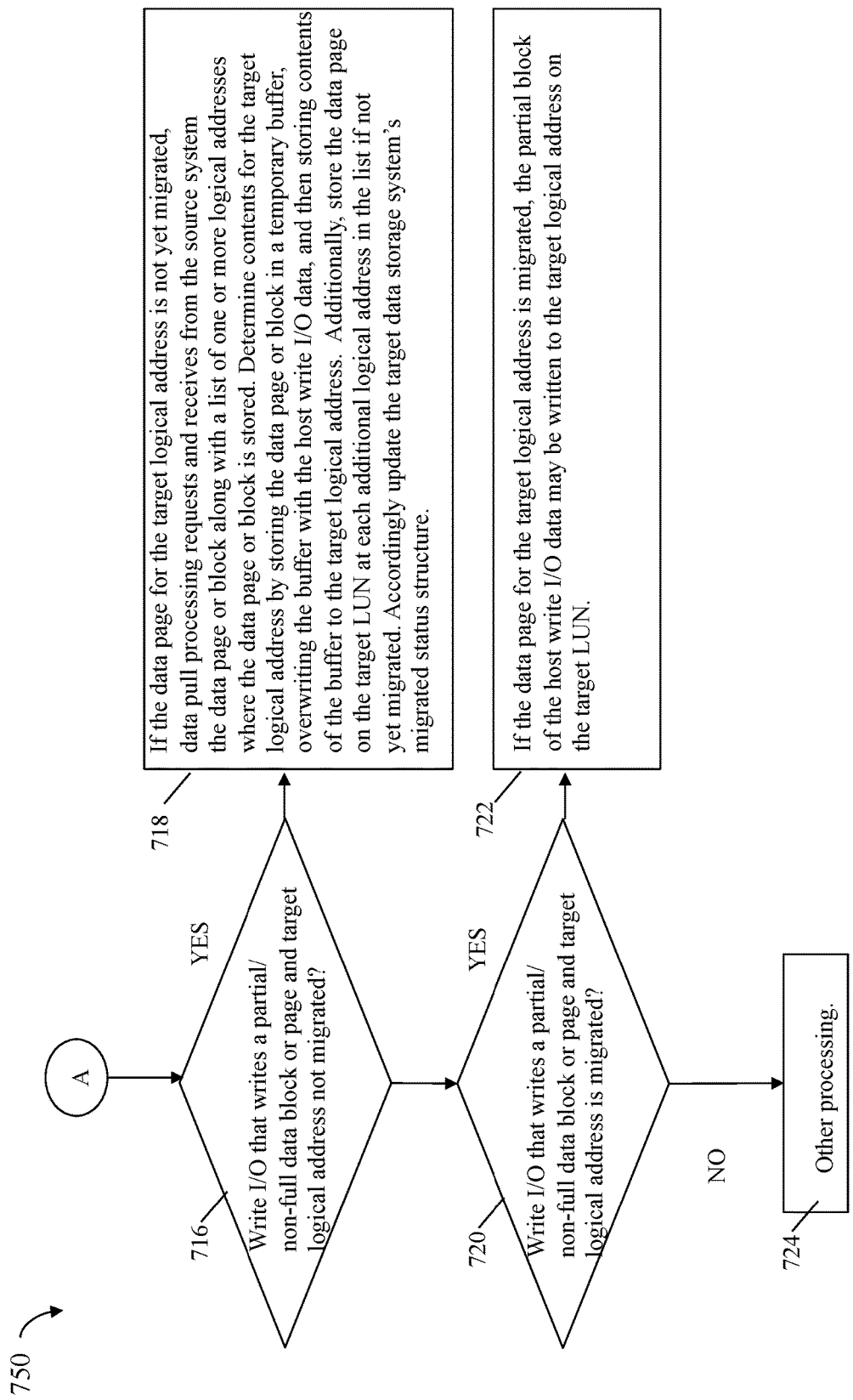

Referring to FIGS. 7A and 7B, shown are flowcharts 700 and 750 of processing steps that may be performed in connection with intercept processing on the target DS for intercepting an I/O operation for the target LUN when the intercept mode is enabled for the target LUN. At the step 702, the target DS receives an I/O operation from the host directed to a target address of the target LUN where the I/O operation is intercepted. From the step 702 control proceeds to the step 704 where it is determined whether the host I/O operation received is a read I/O operation that reads data from a page or block that has already been migrated. If so, processing proceeds to the step 706 to perform normal read processing. If the step 704 evaluates to no, control proceeds to the step 708.

At the step 708, a determination is made as to whether the host I/O operation is a read operation that reads data from a data page or block that is not migrated. If the step 708 evaluates to yes, control proceeds to the step 710. At the step 710, data pull processing requests and receives from the source DS the data page or block along with a list of one or more logical addresses where the data page or block is stored. The data page or block is stored on the target LUN at the target logical address and any other additional logical address(es) in the list whose data has not yet been migrated. The target DS's migrated status structure may be updated to indicate the data page or block stored at the target logical address is migrated. Additionally, the target DS's migrated status structure may be updated to indicate a migrated status for each of the additional logical addresses at which the data page or block is now stored.

If the step 708 evaluates to no, control proceeds to the step 712 where a determination is made as to whether the host I/O operation received is a write I/O that writes a full data block or page. If so, control proceeds to the step 714 where normal write I/O processing is performed. Additionally, processing updates the target DS's migration status structure to indicate the data block or page stored at the target logical address is migrated. If the step 708 evaluates to no, control proceeds to the step 716.

At the step 716, a determination is made as to whether the host I/O operation is a write I/O operation that writes a partial or non-full data block or page and whether the target logical address is not migrated. If the step 716 evaluates to yes, then the host I/O operation is a write operation that writes a partial data block and the data page for the target logical address is not migrated. If the step 716 evaluates to yes, control proceeds to the step 718. At the step 718, data pull processing requests and receives from the source DS the data page or block (stored at the target logical address) along with a list of one or more logical addresses where the data page or block is stored. Processing may determine the contents for the target logical address by storing the data page or block in a temporary buffer, overwriting the buffer with the host write I/O data, and then storing contents of the buffer to the target logical address. Additionally, processing may store the data page on the target LUN at each additional logical address in the list if not migrated. Additionally, processing may accordingly update the target DS's migrated status structure to indicate that the data page or block stored at the target logical address is migrated. The target DS's migrated status structure may be updated to migrated for each additional logical address to which the data page or block has been stored.

If the step 716 evaluates to no, control proceeds to the step 720. At the step 720 a determination is made as whether the host I/O is a write I/O that writes a particular or non-full data block or page and whether the target logical address is migrated. If the step 720 evaluates to yes, then the host I/O operation is a write operation that writes a partial data block and the data page for the target logical address is migrated. If the step 720 evaluates to yes, control proceeds to the step 722. At the step 722, the partial block of the host write I/O data may be written to the target logical address on the target LUN. If the step 722 evaluates to no, control proceeds to the step 724 where other processing is performed for the host I/O operation.

Figure 8:
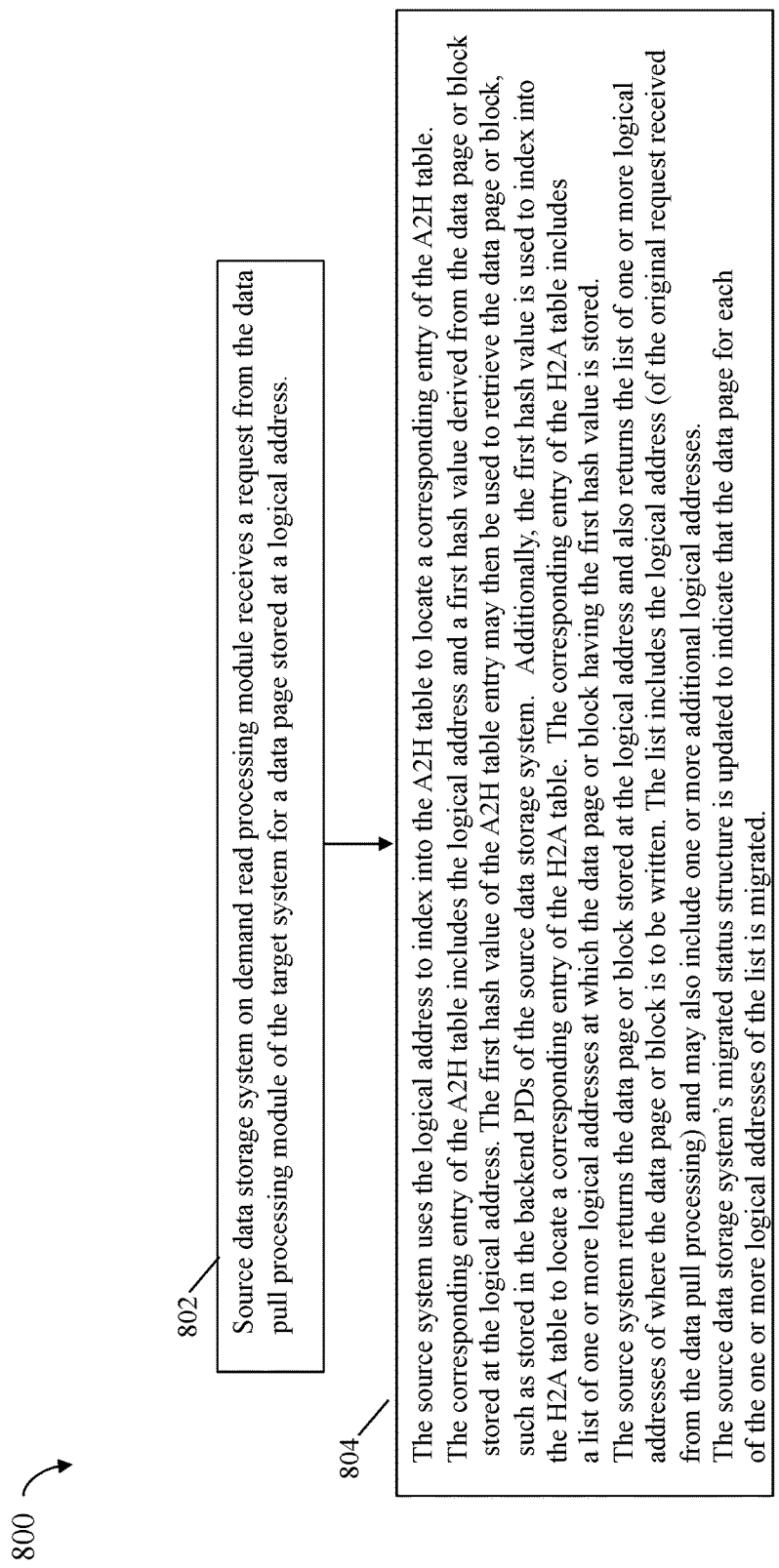

Referring to FIG. 8, shown is a flowchart 800 of processing steps that may be performed in connection with on demand read processing on the source DS in an embodiment in accordance with the techniques herein.

At the step 802, the source DS on demand read processing module receives a request from the data pull processing module of the target DS for a data page stored at a logical address. From the step 802, control proceeds to the step 804.

At the step 804, the source DS uses the logical address to index into the A2H table to locate a corresponding entry of the A2H table. The corresponding entry of the A2H table includes the logical address and a first hash value derived from the data page or block stored at the logical address. The first hash value of the A2H table entry may then be used to retrieve the data page or block, such as stored in the backend PDs of the source data storage system. Additionally, the first hash value is used to index into the H2A table to locate a corresponding entry of the H2A table. The corresponding entry of the H2A table includes a list of one or more logical addresses at which the data page or block having the first hash value is stored. The source DS returns the data page or block stored at the logical address and also returns the list of one or more logical addresses of where the data page or block is to be written. The list includes the logical address (of the original request received from the data pull processing) and may also include one or more additional logical addresses. The source DS's migrated status structure is updated to indicate that the data page for each of the one or more logical addresses of the list is migrated.

Figure 9:
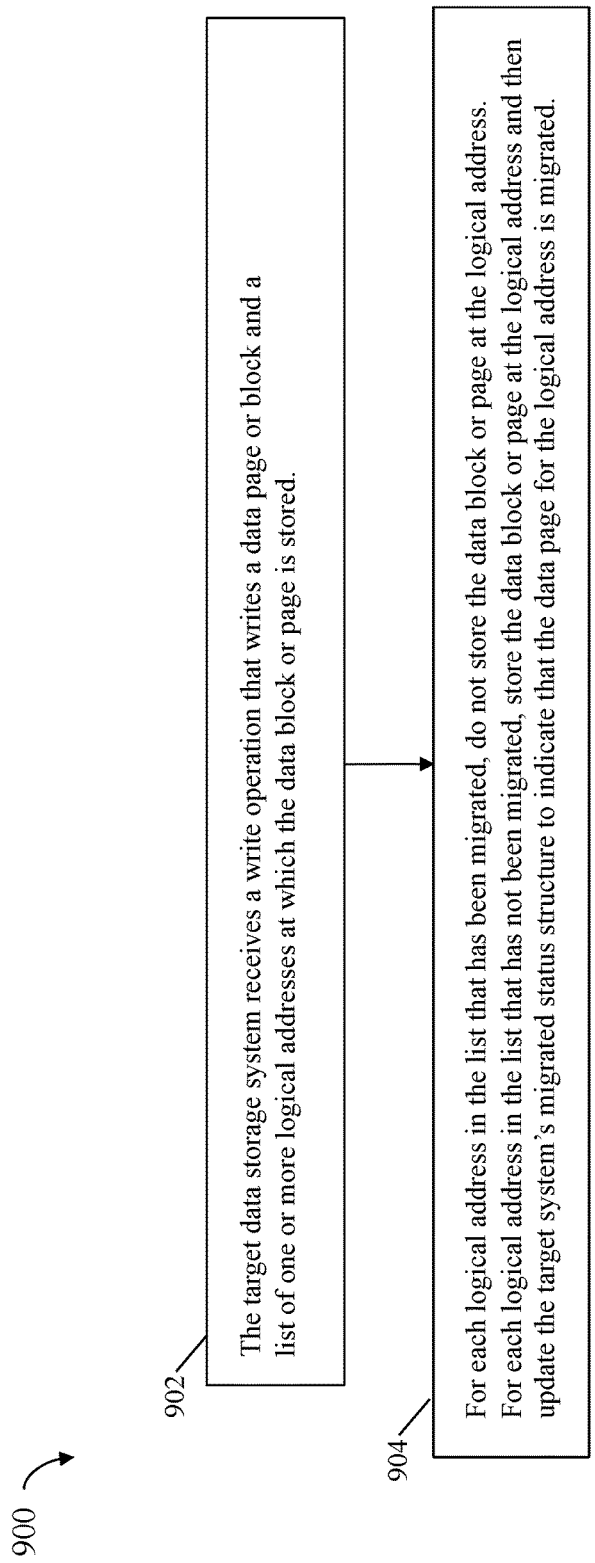

Referring to FIG. 9, shown is a flowchart 900 of processing steps that may be performed on the target DS in an embodiment in accordance with the techniques herein. The flowchart 900 processing may be performed in response to the target DS receiving a write command sent from the push data processing module of the source DS.

At the step 902, the target DS receives a write command that writes a data block or page and a list of one or more logical addresses at which the data block or page is stored on the source LUN. From the step 902, control proceeds to the step 904.

At the step 904, for each logical address in the list that is already indicated as migrated (e.g., by the status structure 450b on the target DS), do not store the data block or page at the logical address. For each logical address in the list that has not been migrated, store the data block or page at the logical address and then update the target DS's migrated status structure 450b to indicate that the data page for the logical address is migrated.

The techniques herein may be performed by any suitable hardware and/or software. For example, techniques herein may be performed by executing code which is stored on any one or more different forms of computer-readable media, where the code may be executed by one or more processors, for example, such as processors of a computer or other system, an ASIC (application specific integrated circuit), and the like. Computer-readable media may include different forms of volatile (e.g., RAM) and non-volatile (e.g., ROM, flash memory, magnetic or optical disks, or tape) storage which may be removable or non-removable.

While the invention has been disclosed in connection with embodiments shown and described in detail, their modifications and improvements thereon will become readily apparent to those skilled in the art. Accordingly, the spirit and scope of the present invention should be limited only by the following claims.

What is claimed is:

1. A method of performing data migration comprising:
   copying data of a source logical device of a source system to a target logical device of a target system;
   during said copying, receiving at the target system a first I/O operation directed to a first logical address of the target logical device and intercepting the first I/O operation on the target system;
   determining, on the target system, to request from the source system a first data page stored at the first logical address;
   responsive to determining to request the first data page stored at the first logical address, performing first processing including:
      issuing a request from the target system to the source system for the first data page stored at the first logical address; and
      responsive to receiving said request, sending first information from the source system to the target system, wherein the first information includes the first data page stored at the first logical address and one or more additional logical addresses of the source logical device at which the first data page is also stored;
   receiving, by the source system from the target system, the request for the first data page stored at the first logical address;
   determining a first hash value for the first data page using an address to hash (A2H) table that maps logical addresses to hash values, wherein the first logical address is mapped to the first hash value by the A2H table;
   using the first hash value to obtain the first data page; and
   determining a list of logical addresses that reference the first data page using a hash to address (H2A) table, wherein the list includes the first logical address and the one or more additional logical addresses, wherein the H2A table maps hash values to logical addresses and the H2A table includes a first entry for the first hash value indicating that the first hash value is mapped to the first logical address and the one or more additional logical addresses.

2. The method of claim 1, wherein the source system uses a structure to track what data pages of the source device have been migrated to the target system.

3. The method of claim 2, wherein after said copying copies a page of data stored at a logical address of the source logical device, updating the structure to indicate that the page of data stored at the logical address of the source logical device has been migrated.

4. The method of claim 2, wherein the first processing includes:
after said sending the first information from the source system to the target system, updating the structure of the source system to indicate that the first data page has been migrated for the first logical address and each of the one or more additional logical addresses.

5. The method of claim 1, wherein said copying includes scanning, by the source system, the H2A table for the source logical device.

6. The method of claim 5, wherein the H2A table indicates a mapping between a plurality of hash values and a plurality of logical addresses of the source logical device, and wherein the source system is a content addressable storage (CAS) system having a plurality of data pages stored at the plurality of logical addresses, and each of the plurality of data pages has a corresponding one of the plurality of hash values.

7. The method of claim 6, wherein the source system organizes data stored on first non-volatile physical storage by hash values and wherein the source system uses the first hash value to obtain the first page of data from the first non-volatile physical storage.

8. The method of claim 7, wherein the first data page is content stored at the first logical address and the one or more additional logical addresses, and wherein the first data page is stored at a first physical storage location that is mapped to the first logical address and the one or more additional logical addresses as a result of data deduplication processing performed on the source system.

9. The method of claim 8, wherein the target system is a non-CAS system that organizes data stored on second non-volatile storage by physical addresses that are mapped to corresponding logical addresses, and wherein the target system uses the first logical address to identify a first physical address on the second non-volatile storage, where the first page of data is located at the first physical address.

10. The method of claim 1, wherein the first I/O operation is a read operation and said copying has not yet copied the first data page stored at the first logical address to the target system, and wherein said determining determines to request the first data page from the source system in response to determining that the first I/O operation is the read operation and that said copying has not yet copied the first data page stored at the first logical address to the target system.

11. The method of claim 10, further comprising:
determining, on the target system using a structure of the target system, whether a data page for each of the one or more additional logical addresses is migrated;
responsive to determining the data page for said each additional logical address is not migrated, storing the first data page at said each logical address of the target logical device and updating the structure to indicate that the data page of said each additional logical address is migrated;
storing the first data page at the first logical address of the target logical device; and
updating the structure to indicate that the first data page stored at the first logical address is migrated.

12. A method of performing data migration comprising:
copying data of a source logical device of a source system to a target logical device of a target system;
during said copying, receiving at the target system a first I/O operation directed to a first logical address of the target logical device and intercepting the first I/O operation on the target system;
determining, on the target system, to request from the source system a first data page stored at the first logical address;
responsive to determining to request the first data page stored at the first logical address, performing first processing including:
issuing a request from the target system to the source system for the first data page stored at the first logical address; and
responsive to receiving said request, sending first information from the source system to the target system, wherein the first information includes the first data page stored at the first logical address and one or more additional logical addresses of the source logical device at which the first data page is also stored, wherein the first I/O operation is a write I/O operation that writes a partial page of data and said copying has not yet copied the first data page stored at the first logical address to the target system, and wherein said determining determines to request the first data page from the source system in response to determining that the first I/O operation is the write operation that writes a partial page of data and that said copying has not yet copied the first data page stored at the first logical address to the target system.

13. The method of claim 12, further comprising:
determining, on the target system using a structure of the target system, whether a data page for each of the one or more additional logical addresses is migrated;
responsive to determining the data page for said each additional logical address is not migrated, storing the first data page at said each logical address of the target logical device and updating the structure to indicate that the data page of said each additional logical address is migrated;
storing the first data page in a buffer and overwriting the buffer with the partial page of data written by the write I/O operation;
storing contents of the buffer at the first logical address on the target logical device; and
updating the structure to indicate that data stored at the first logical address is migrated.

14. A method of performing data migration comprising:
copying data of a source logical device of a source system to a target logical device of a target system;
during said copying, receiving at the target system a first I/O operation directed to a first logical address of the target logical device and intercepting the first I/O operation on the target system;
determining, on the target system, to request from the source system a first data page stored at the first logical address;
responsive to determining to request the first data page stored at the first logical address, performing first processing including:
issuing a request from the target system to the source system for the first data page stored at the first logical address; and
responsive to receiving said request, sending first information from the source system to the target system, wherein the first information includes the first data page stored at the first logical address and one or more additional logical addresses of the source logical device at which the first data page is also stored, wherein the first I/O operation is a write I/O operation that writes a partial page of data and said copying has copied the first data page stored at the first logical address to the target system, and wherein said determining determines not to request the first data page from the source system.

15. The method of claim 14, further comprising:
writing the partial page of data of the write operation to the first logical address.

16. A system comprising:
one or more processors; and
one or more memories comprising code stored thereon that, when executed, performs a method of data migration comprising:
  copying data of a source logical device of a source system to a target logical device of a target system;
  during said copying, receiving at the target system a first I/O operation directed to a first logical address of the target logical device and intercepting the first I/O operation on the target system;
  determining, on the target system, to request from the source system a first data page stored at the first logical address;
  responsive to determining to request the first data page stored at the first logical address, performing first processing including:
    issuing a request from the target system to the source system for the first data page stored at the first logical address; and
    responsive to receiving said request, sending first information from the source system to the target system, wherein the first information includes the first data page stored at the first logical address and one or more additional logical addresses of the source logical device at which the first data page is also stored;
  receiving, by the source system from the target system, the request for the first data page stored at the first logical address;
  determining a first hash value for the first data page using an address to hash (A2H) table that maps logical addresses to hash values, wherein the first logical address is mapped to the first hash value by the A2H table;
  using the first hash value to obtain the first data page; and
  determining a list of logical addresses that reference the first data page using a hash to address (H2A) table, wherein the list includes the first logical address and the one or more additional logical addresses, wherein the H2A table maps hash values to logical addresses and the H2A table includes an entry for the first hash value indicating that the first hash value is mapped to the first logical address and the one or more additional logical addresses.

17. A non-transitory computer readable medium comprising code stored thereon that, when executed, performs a method of performing data migration comprising:
  copying data of a source logical device of a source system to a target logical device of a target system;
  during said copying, receiving at the target system a first I/O operation directed to a first logical address of the target logical device and intercepting the first I/O operation on the target system;
  determining, on the target system, to request from the source system a first data page stored at the first logical address;
  responsive to determining to request the first data page stored at the first logical address, performing first processing including:
    issuing a request from the target system to the source system for the first data page stored at the first logical address; and
    responsive to receiving said request, sending first information from the source system to the target system, wherein the first information includes the first data page stored at the first logical address and one or more additional logical addresses of the source logical device at which the first data page is also stored;
  receiving, by the source system from the target system, the request for the first data page stored at the first logical address;
  determining a first hash value for the first data page using an address to hash (A2H) table that maps logical addresses to hash values, wherein the first logical address is mapped to the first hash value by the A2H table;
  using the first hash value to obtain the first data page; and
  determining a list of logical addresses that reference the first data page using a hash to address (H2A) table, wherein the list includes the first logical address and the one or more additional logical addresses, wherein the H2A table maps hash values to logical addresses and the H2A table includes an entry for the first hash value indicating that the first hash value is mapped to the first logical address and the one or more additional logical addresses.

18. A non-transitory computer readable medium comprising code stored thereon that, when executed, performs a method of performing data migration comprising:
  copying data of a source logical device of a source system to a target logical device of a target system;
  during said copying, receiving at the target system a first I/O operation directed to a first logical address of the target logical device and intercepting the first I/O operation on the target system;
  determining, on the target system, to request from the source system a first data page stored at the first logical address;
  responsive to determining to request the first data page stored at the first logical address, performing first processing including:
    issuing a request from the target system to the source system for the first data page stored at the first logical address; and
    responsive to receiving said request, sending first information from the source system to the target system, wherein the first information includes the first data page stored at the first logical address and one or more additional logical addresses of the source logical device at which the first data page is also stored, wherein the first I/O operation is a write I/O operation that writes a partial page of data and said copying has not yet copied the first data page stored at the first logical address to the target system, and wherein said determining determines to request the first data page from the source system in response to determining that the first I/O operation is the write operation that writes a partial page of data and that said copying has not yet copied the first data page stored at the first logical address to the target system.

19. A system comprising:
one or more processors: and
one or more memories comprising code stored thereon that, when executed, performs method of performing data migration comprising:
    copying data of a source logical device of a source system to a target logical device of a target system;
    during said copying, receiving at the target system a first I/O operation directed to a first logical address of the target logical device and intercepting the first I/O operation on the target system;
    determining, on the target system, to request from the source system a first data page stored at the first logical address;
    responsive to determining to request the first data page stored at the first logical address, performing first processing including:
        issuing a request from the target system to the source system for the first data page stored at the first logical address; and
        responsive to receiving said request, sending first information from the source system to the target system, wherein the first information includes the first data page stored at the first logical address and one or more additional logical addresses of the source logical device at which the first data page is also stored, wherein the first I/O operation is a write I/O operation that writes a partial page of data and said copying has not yet copied the first data page stored at the first logical address to the target system, and wherein said determining determines to request the first data page from the source system in response to determining that the first I/O operation is the write operation that writes a partial page of data and that said copying has not yet copied the first data page stored at the first logical address to the target system.

20. A non-transitory computer readable medium comprising code stored thereon that, when executed, performs a method of performing data migration comprising:
    copying data of a source logical device of a source system to a target logical device of a target system;
    during said copying, receiving at the target system a first I/O operation directed to a first logical address of the target logical device and intercepting the first I/O operation on the target system;
    determining, on the target system, to request from the source system a first data page stored at the first logical address;
    responsive to determining to request the first data page stored at the first logical address, performing first processing including:
        issuing a request from the target system to the source system for the first data page stored at the first logical address; and
        responsive to receiving said request, sending first information from the source system to the target system, wherein the first information includes the first data page stored at the first logical address and one or more additional logical addresses of the source logical device at which the first data page is also stored, wherein the first I/O operation is a write I/O operation that writes a partial page of data and said copying has copied the first data page stored at the first logical address to the target system, and wherein said determining determines not to request the first data page from the source system.

21. A system comprising:
one or more processors: and
one or more memories comprising code stored thereon that, when executed, performs method of performing data migration comprising:
    copying data of a source logical device of a source system to a target logical device of a target system;
    during said copying, receiving at the target system a first I/O operation directed to a first logical address of the target logical device and intercepting the first I/O operation on the target system;
    determining, on the target system, to request from the source system a first data page stored at the first logical address;
    responsive to determining to request the first data page stored at the first logical address, performing first processing including:
        issuing a request from the target system to the source system for the first data page stored at the first logical address; and
        responsive to receiving said request, sending first information from the source system to the target system, wherein the first information includes the first data page stored at the first logical address and one or more additional logical addresses of the source logical device at which the first data page is also stored, wherein the first I/O operation is a write I/O operation that writes a partial page of data and said copying has copied the first data page stored at the first logical address to the target system, and wherein said determining determines not to request the first data page from the source system.

* * * * *